(12) United States Patent
Rose et al.

(10) Patent No.: US 7,639,739 B2
(45) Date of Patent: Dec. 29, 2009

(54) TECHNIQUE TO ENABLE EFFICIENT ADAPTIVE STREAMING AND TRANSCODING OF VIDEO AND OTHER SIGNALS

(75) Inventors: Kenneth Rose, Ojai, CA (US); Rui Zhang, Fremont, CA (US); Shankar Regunathan, Bellevue, WA (US)

(73) Assignee: The Regents of the University of California, Oakland, CA (US)

( * ) Notice: Subject to any disclaimer, the term of this patent is extended or adjusted under 35 U.S.C. 154(b) by 1354 days.

(21) Appl. No.: 10/286,364

(22) Filed: Nov. 1, 2002

(65) Prior Publication Data

US 2003/0099298 A1 May 29, 2003

Related U.S. Application Data

(60) Provisional application No. 60/350,095, filed on Nov. 2, 2001.

(51) Int. Cl.
*H04N 7/12* (2006.01)
(52) U.S. Cl. .............................. 375/240.01; 375/240.27
(58) Field of Classification Search ............ 375/240.01, 375/240.02, 240.22, 232, 240.27, 240.29, 375/240.1; 725/94; 370/328, 335, 389
See application file for complete search history.

(56) References Cited

U.S. PATENT DOCUMENTS 5,105,440 A * 4/1992 Huellwegen ................. 375/232
5,168,356 A    12/1992 Acampora et al.
5,682,152 A    10/1997 Wang et al.
6,026,164 A     2/2000 Sakamoto et al.
6,208,643 B1 *  3/2001 Dieterich et al. ............. 370/389
6,999,432 B2 *  2/2006 Zhang et al. ................. 370/328
7,254,120 B2 *  8/2007 LeBlanc ...................... 370/335
7,260,826 B2 *  8/2007 Zhang et al. .................. 725/94

* cited by examiner

*Primary Examiner*—Gims S Philippe
(74) *Attorney, Agent, or Firm*—John P. O'Banion

(57) ABSTRACT

A method is described for efficiently determining total end-to-end distortion of a pre-compressed data stream, such as video streams or other media streams, at the time of delivery over a lossy-network, and for providing adaptive error-resilient delivery schemes based on distortion estimates. The methods can be utilized with single or multilayer packet streams and are particularly well suited for video streams. By way of example, distortion estimates are performed by generating side-information at the time of data stream compression, wherein the side-information is used in conjunction with information about the network status to determine an estimated distortion for the group of packets when the data stream is transported over the network to a destination end. This estimation may be utilized within described resiliency techniques in which the error correction mechanism is selected in response to the estimated distortion, which may be additionally refined in reference to cost factors.

48 Claims, 15 Drawing Sheets

TECHNIQUE TO ENABLE EFFICIENT ADAPTIVE STREAMING AND TRANSCODING OF VIDEO AND OTHER SIGNALS

CROSS-REFERENCE TO RELATED APPLICATIONS

This application claims priority from U.S. provisional application Ser. No. 60/350,095 filed on Nov. 2, 2001, incorporated herein by reference.

STATEMENT REGARDING FEDERALLY SPONSORED RESEARCH OR DEVELOPMENT

This invention was made with Government support under Grant No. MIP-9707764, awarded by the National Science Foundation. The Government has certain rights in this invention.

REFERENCE TO A COMPUTER PROGRAM APPENDIX

Not Applicable

BACKGROUND OF THE INVENTION

1. Field of the Invention

The invention pertains generally to data streaming applications, and more particularly to methods and apparatus for estimating end-to-end distortion within a network which can allow optimizing streaming delivery strategies for pre-compressed data, such as video and other forms of media, and for utilizing distortion estimation within a rate-distortion framework for providing optimized resilient delivery of pre-compressed data streams.

2. Description of the Background Art

The Internet has experienced explosive growth in recent years, and the once textual nature of network transmissions is shifting toward an increasing amount of streaming data (media) transfers, such as video streaming. As sufficient bandwidth and computational resources become available, video streaming applications have begun to attract increasing levels of attention. However, the heterogeneous and time-variant nature of current IP networks still presents a number of challenges for video coding algorithms and adaptive delivery schemes. One major requirement is to provide a robust video streaming system so that the perceived quality of the video stream varies in a graceful manner in response to periodic network quality of service (QoS) fluctuations.

It is important to distinguish between two main transmission paradigms for video communication over the networks, namely, live video and pre-compressed video. One major difference being that network status information is available during compression at the time of transmitting live video. When distributing live content, the encoder compresses and/or processes the raw data and passes the bit-stream to the network at the time of transmission. If the encoder has knowledge of the current status of the underlying network resources, it can as a result analyze the end-to-end behavior of the system in response to the video feed. Consequently, the streaming of live video allows efficient and flexible source and channel coding methodologies to be employed to optimize the performance of a given network for the video stream.

The above approach, however, is incompatible with the increasing number of applications that stream pre-compressed video over the network. It will be appreciated that for pre-compressed video the network conditions are not known at the time of compressing the video. Although numerous applications exist for streaming pre-compressed video, one area of widespread activity relates to streaming pre-compressed video delivered as "video on demand". The raw video content for "video on demand" is compressed offline and stored on servers for later distribution over the network. The delivery of the streaming video is subject to whatever network conditions exist when the content is delivered according to customer demand. It should be noted that network conditions may vary in response to a number of parameters of the network, such as available bandwidth, packet loss probability, delay jitter, routing, availability of links between the server (transmitter) and client (receiver).

Variance of network conditions can substantially impact system performance, wherein employing adaptive source/channel coding techniques at the time of delivery can reduce variations in the perceived quality of received content. The optimization of adaptive strategies requires that the distortion of the reconstructed video at the receiver be estimated. The end-to-end distortion value (dB) quantifying the difference between the original raw media data and the decoder reconstructed signal taking into account compression, packet loss, and error concealment. It should be appreciated that the estimation of end-to-end distortion is fundamental to performing optimal transmission of pre-compressed video regardless of the application. However, a number of difficulties arise when estimating end-to-end distortion for a pre-compressed video stream for which parameters of the original video, prior to compression, are not available.

Attempts have been proposed for solving the problems with the streaming of pre-compressed video. It has been recognized that the ideal resilience strategy at the server is one which adapts to the actual bandwidth and packet loss statistics of the network in order to minimize the expected end-to-end distortion (i.e. the perceived distortion of the reconstructed video at the receiver). A Lagrangian rate-distortion (RD) framework was proposed to achieve the optimal adaptation strategy. The practical utility of the approach, however, is limited by the accuracy and efficiency of estimating end-to-end distortion.

It should be appreciated that the task of computing end-to-end distortion is complicated by a number of inter-related factors, including (prior) quantization, packet loss statistics, error resilience procedures, and error concealment. In addition, the use of inter-frame prediction in video coders causes spatial and temporal error propagation, and hence additional inter-dependencies between packets. Furthermore, unlike the coding and transmission of a live video stream, two important pieces of information are missing for a system delivering pre-compressed media. Specifically, the actual network status is unknown at the time of compressing the video stream, and the error resilience procedures employed at the time of delivery have no access to the original video. Therefore, the optimal error resilience approaches which are utilized for delivering live video are not suitable for use with pre-compressed video streams because the effective packet loss rate and original video data stream are not simultaneously available.

In order to render distortion estimation tractable, current approaches either neglect inter-frame error propagation, or ignore the effects of error concealment. The inaccuracies that arise from these limited approaches, however, can seriously compromise the performance of the adaptive strategies.

Therefore, a need exists for end-to-end distortion estimation methods that can readily determine expected distortion for pre-compressed video streams without ignoring inter-frame propagation and error concealment. Additionally, methods are needed for employing distortion estimations within an RD-framework for optimizing delivery of pre-compressed video streams. The present invention satisfies those needs, as well as others, and overcomes the deficiencies of previously developed distortion estimation techniques and adaptive transport tools.

BRIEF SUMMARY OF THE INVENTION

The present invention describes a method for estimating overall end-to-end distortion for a pre-compressed data stream, such as a video stream or similar media stream, which enables transmitters, intermediary nodes, and other network equipment, to provide optimized adaptive delivery schemes within a rate-distortion (RD) framework. The present invention may be generally practiced on a variety of data streams and is particularly well suited for media streams such as video streams. Therefore, any reference to use on media streams and video streams herein are provided by way of example and are not intended to limit the practice of the invention.

The present approach estimates total end-to-end distortion while taking into account the effects of quantization, compression, inter-dependencies among packets through prediction along with error propagation, packet loss, and error concealment. The distortion estimation method is a comprehensive approach to estimating overall end-to-end distortion for pre-compressed data streams, such as video and other forms of media. Apparatus and methods are described for estimating the end-to-end distortion within a lossy network, and for utilizing the distortion estimations within adaptive transport tools.

Practicing the invention requires that a small amount of "side-information" be computed for the media stream and made available by way of a means for accessing side-information for performing a subsequent distortion estimation on the video stream at the time of delivery. It will be appreciated that a number of conventional compression mechanisms and elements are known for removing the redundancies within a source data stream as a resultant compressed data stream is generated. It should also be appreciated that the present apparatus and methods may be utilized with any convenient compression element, or methodology. It will be noted that processing elements utilized for processing data streams within the present invention are configured for retrieving data and/or control information, such as in the form of side-information and/or pre-compressed data streams.

Typically, side-information is generated during data stream compression and is preferably stored for simultaneous access with the pre-compressed data stream, such as a pre-compressed video stream and associated side-information being stored on a server. By way of example, for each packet in the GOP, distortion may be calculated for the entire GOP with and without the given packet data. To enhance accuracy, distortion slope related information may be included in the side-information, such as by computing and storing the partial derivative in association with the reference distortion. This information is collected for all packets and over a range of network status values. For each reference network status value, the expected GOP distortion is also calculated which is an average over all possible loss scenarios, assuming more than one reference network status value. Generation of side-information thus typically requires knowledge of the compression methods utilized and preferably involves the decoding of compressed data under different possible packet loss scenarios and comparing this to the original source data. Therefore, side-information may be generated during or after compression so long as the original source data is still available.

The pre-compressed video is assumed to be packetized into independent groups of packets (GOPs). Packets within a GOP may depend on each other due to prediction considerations. The expected distortion of each GOP, however, may be calculated separately as there is no dependency across the boundaries from one GOP to the next. An expected GOP distortion is determined considering possible delivery events within the packets of a GOP.

An exact distortion estimation method is described which considers all possible error events, and takes into account the effects of compression, packet loss, error propagation, error concealment, and so forth. A number of distortion estimation methods are described which provide different levels of accuracy with accordingly different computational and side-information requirements. A preferred first-order distortion estimation (FODE) algorithm utilizing a Taylor expansion is described which was found to provide reasonable accuracy, low computational overhead, and low side-information requirements.

Another benefit provided by the present invention is that distortion estimates are produced which are linearly dependent on the packet loss statistics, wherein low-complexity, fast packet-loss resilience procedures may be implemented which offer rate-distortion optimization. Diverse adaptive delivery scenarios may be served by the inventive method, including but not limited to the following. (1) Video-on-demand in which the video clip is pre-compressed and stored on a media, such as a disk drive, along with side-information. Adaptive error protection methods are then employed to transmit the content according to network conditions at the time of transmission to assure achieving the desired tradeoff between perceived quality and transmission cost. (2) Media distribution through heterogeneous networks in which the transmission path includes intermediate servers (i.e. proxy servers) wherein transcoding or re-optimization of the information is performed at various nodes (routers) to optimize overall QoS. An example being that of a mixed wired and/or wireless transmission system with transcoding performed at the gateway for a last wireless hop, in which adaptive error protection schemes are required for enhancing error resilience. (3) Multicast transmission of the pre-compressed video, wherein the pre-compressed video is transmitted to multiple receivers with heterogeneous channel status and process power. Distortion estimation information being essential for performing RD-optimized subscription and de-subscription within the receiver-driven system.

The present distortion estimation methods are virtually independent of the delivery schemes utilized within a given application. Therefore, a large variety of adaptable error control methodologies within different delivery applications are readily served by the invention.

In general, the method estimates end-to-end distortion within a packet based communication channel for a data stream. The method comprises generating information about a data stream during data compression. Typically, video streams are utilized in conjunction with the present invention, as will often be described herein, however, it should be remembered that the practice of the invention is not limited to video streams. The information generated about the data stream is preferably separable from the compressed video stream, whereby it is referred to as side-information. Total end-to-end distortion can then be estimated at the time of delivery of the data stream based upon received network status values and the generated side-information. Estimation of distortion may be performed by selecting one or more reference distortion values from within the side-information at the time of transmission in response to a received value for the network status. The particular reference distortion values selected are the values that were generated from network status values having a desired relationship with the actual network status value. In typical applications the relationship would be one of similarity, wherein the reference distortion value would be chosen which was generated from a reference network status value that is most similar to the actual network status at the time of transmission. The estimation may then be further refined as desired, such as by the use of slope related information associated with the reference distortion values, wherein the distortion estimation may be corrected for the difference (range) between any selected reference network status value and the actual received network status value. The slope information may comprise a low-order partial derivative, such as a first or second-order partial derivative. Alternatively, when multiple reference network status values are available, the distortion estimation may be corrected in response to the additional reference distortion values, such as by interpolation.

Although the network status information could be comprised of a number of channel related factors, one preferred implementation that will be described herein is that of utilizing the packet loss rate as a measure of network status. It should be appreciated that the packet loss rate for many applications is a useful quantifier of network status for the purpose of determining end-to-end overall distortion.

The present invention also describes apparatus and methods that may be broadly practiced within adaptive transport tools including adaptive error correction, such as the selection of forward error correction, retransmission decisions with or without feedback information, subscription and de-subscription to service layers in a receiver-driven system, support for selectable QoS levels, and so forth along with combination approaches thereof.

The adaptive transport tools determine transport policy selections based on estimated distortion values at the time of data stream transport, such as described earlier, to provide error resilience mechanisms directed toward optimizing delivery decisions. Additionally, the adaptive transport tools may be implemented to take transport cost factors into account when selecting a transport policy.

It will be appreciated therefore that the present invention provides apparatus and method for estimating end-to-end distortion at the time of transmission for data streams which have been stored in a compressed form prior to transport, and which are referred to herein as pre-compressed data streams. This aspect of the invention can be generally practiced by: (1) generating information (side-information) about a data stream, such as selected characteristics of the uncompressed data stream in relation with the compressed data stream, while the original uncompressed source data stream is still available; and (2) estimating total end-to-end distortion at the time of delivery based upon received actual network status values and the generated data stream information. The side-information being computed for one or more reference network status values based upon information within the original uncompressed data stream in relation with the compression encoding. The actual network status value being utilized for selecting a reference distortion value within the side-information that was computed from a reference network status value similar to the actual network status value received.

The distortion estimation may be refined by using additional side-information, such as partial derivatives, other reference distortion values (i.e. interpolation), and so forth for correcting the reference distortion value. One method of performing this correction utilizes correcting the reference distortion value by utilizing slope information, stored within the side information, over the range of difference between the actual network status value and the reference network status associated with the selected reference distortion value to generate an offset for application to the selected distortion value.

The present invention also generally describes an adaptive delivery method and apparatus for delivering pre-compressed data streams over a network. The method involved generally comprises: (1) estimating distortion for a pre-compressed data stream to be transported over a network based on status information received from the network and side-information collected about the pre-compressed data stream prior to its compression; and (2) transporting the pre-compressed data stream utilizing an error correction scheme selected from a plurality of error correction schemes based on the distortion estimation. The distortion estimate is preferably utilized to select a transport policy that provides the desired tradeoff between transmission quality and cost within the network.

An object of the invention is to estimate end-to-end distortion within a network over which pre-compressed video is to be transmitted.

Another object of the invention is to allow performing distortion estimations at the time of transmission without access to the original data stream.

Another object of the invention is to provide a distortion estimation method wherein a small amount of side-information for a given data stream is computed and utilized at the time of transmission for estimating distortion according to the present invention.

Another object of the invention is to provide a distortion estimation method that may be readily applied to numerous applications, such as within adaptive error correction mechanisms.

Another object of the invention is to provide a distortion estimation method that may be applied to virtually all existing media compression and error resilience techniques.

Another object of the invention is to provide a distortion estimation method that is particularly well suited for use in "video-on-demand", media distribution through heterogeneous networks, and multicast transmission of pre-compressed video.

Another object of the invention is to provide a distortion estimation method whose computational complexities and storage requirements are low.

Another object of the invention is to provide a distortion estimation method that may be deployed within a Lagrangian rate-distortion (RD) framework.

Another object of the invention is to provide an end-to-end distortion estimation method that is linearly dependent on packet loss statistics within the network.

Another object of the invention is to provide end-to-end distortion estimations which are substantially independent of the compression framework utilized within a particular delivery mechanism.

Another object of the invention is to provide a distortion estimation method that may be utilized as a basis for selecting transmission policies in response to network conditions at the time of delivery.

Another object of the invention is to provide a distortion estimation method that is compatible with video compression devices (coders) that utilize motion compensation for removing temporal redundancy within the video stream.

Another object of the invention is to provide a distortion estimation method that is compatible with both single layer systems, and layered video coding structures, such as scalable coding provided within the H.263+ specification or similarly scaled architectures.

Another object of the invention is to provide a distortion estimation method that is capable of taking error concealment mechanisms into account so that proper transmission error policy decisions may be reached.

Another object of the invention is to provide RD-based delivery mechanisms for pre-compressed video streaming applications.

Another object of the invention is to provide adaptive error-resilience within the RD-based delivery mechanism.

Another object of the invention is to provide an RD-based delivery mechanism in which delivery policies are determined in response to distortion estimations.

Another object of the invention is to provide RD-based delivery mechanisms for pre-compressed video in which cost and QoS tradeoffs may be taken into account.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
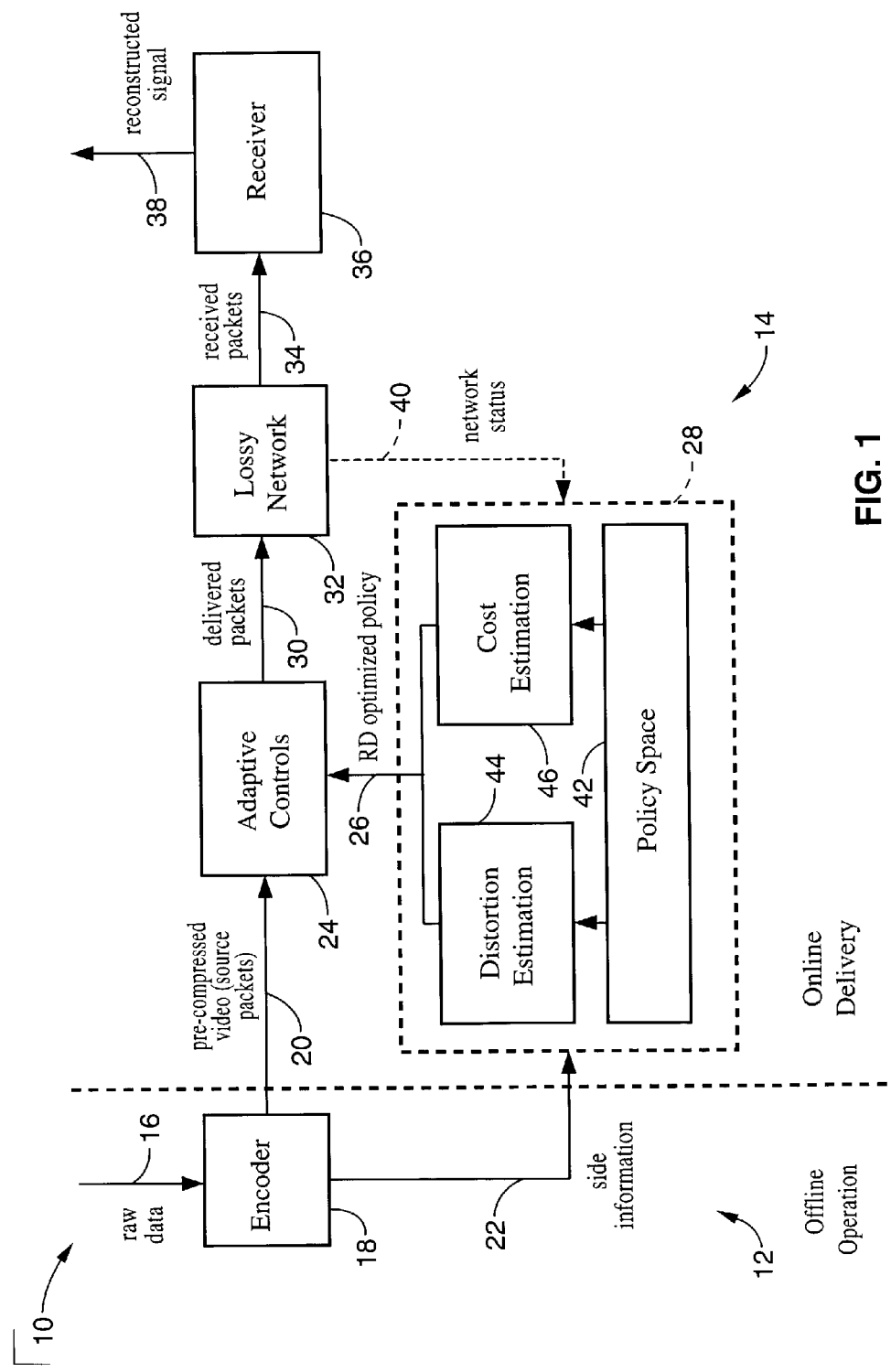
FIG. 1 is a block diagram of a general RD-optimized framework for a delivery system for pre-compressed video according to an embodiment of the present invention.

Referring more specifically to the drawings, for illustrative purposes the present invention is embodied in the apparatus generally shown in FIG. 1, and FIG. 3 through FIG. 14. It will be appreciated that the apparatus may vary as to configuration and as to details of the parts, and that the method may vary as to the specific steps and sequence, without departing from the basic concepts as disclosed herein.

1. Defining a General Delivery System for Pre-Compressed Video

A general delivery system for pre-compressed data streams, such as video, is described that is applicable to the majority of current application settings. The rate-distortion framework is discussed in relation to optimization of the delivery procedures for the pre-compressed data stream. The importance and the obstacles associated with providing end-to-end distortion estimations are explained in detail to provide a motivation and appreciation for the problem scope. Although, it may be applied to various forms of data streams, the present invention will be generally described according to its use in pre-compressed video streams for which it is particularly well suited.

1.1 Adaptive Delivery of Pre-Compressed Video

The heterogeneous and time-variant nature of current IP networks presents a number of challenges when attempting to implement robust communication systems. The characteristics of any given network over time are subject to wide variation which must to be taken into account for a given video stream at the time of delivery if optimized delivery is desired. It will be appreciated that optimized delivery may be considered in view of reaching a desired quality of service (QoS) within a cost constraint, or of making a desired tradeoff between cost and quality of service. It should be appreciated that the characteristics of the network may be affected by the actual network path, the characteristics of routers and communication channels from one point to another, connection parameters (i.e. bandwidth, packet loss statistics, delivery delay), and a number of additional characteristics that can impact the end-to-end distortion to which a video transmission is subject. In addition, each of the characteristics are subject to temporal fluctuation, such as in response to load variations and other network conditions, wherein each video packet being transmitted is individually subject to time varying conditions which can impact distortion of the reconstructed signal.

It should be appreciated, therefore, that it is advantageous to provide adaptive protection of the streamed pre-compressed video during transmission. Optimally, the adaptive protection should respond immediately to the time varying conditions of the network as represented by the actual channel status. An inherent difficulty in optimizing transmission arises in the case of transmitting pre-compressed video.

When transmitting pre-compressed video, the actual channel status is not available at the time of compression, while the original source data is not available at the time of delivery. Consequently, it has been difficult to achieve adaptive protection of pre-compressed video that approaches optimal adaptation for the transmitted packets within the stream in response to actual channel status. Moreover, practical restrictions on server complexity often preclude the use of complex algorithms that perform modifications at the source-syntax level, such as requantization of the source bit-stream. It is preferable, therefore, that adaptation be based on simple transport level tools, such as forward error correction (FEC), automatic retransmission on request (ARQ), or similar low-complexity approaches.

FIG. 1 depicts a general RD-optimized framework for a delivery system 10 for pre-compressed video according to an embodiment of the present invention. Two phases of delivery are depicted as an offline preparation process 12 which is separated from an online delivery process 14 by a delay period of any desired length (not shown). The delivery process 14 is preferably performed by a video server that stores the pre-compressed video 20 and associated side-information 22, and which transports the video over a network, such as in response to a client request.

A raw video data stream 16 is received by an encoder 18 which compresses the video stream according to any arbitrary encoding technique to generate a pre-compressed video stream 20. It should be appreciated that compression occurs without knowledge of the network conditions under which the data will be eventually transported over the network. The encoder may be implemented using any convenient form of digital logic circuitry or processing elements. It is contemplated that employing a processing element configured for executing programmed instructions, such as a microprocessor or similar programmable execution circuit, in a similar manner to that utilized in conventional encoders can provide a flexible implementation at a low cost. After the generation of side information and compression, the pre-compressed video and associated side-information would typically be retained on a storage media, such as the disk drive media of a video file server, (not shown), which is located either locally or remotely, and configured for delivering the pre-compressed data stream and side-information at a future time, such as served as files to the transport mechanisms at the source end of the network.

Encoder 18, is configured according to an aspect of the present invention for generating side-information 22 relating to the raw video content, which is preferably stored for access in conjunction with the pre-compressed video stream at the time of transmission. It should be appreciated that the side-information may be associated with the pre-compressed video according to any convenient technique, such as naming conventions within a shared retention resource (i.e. files on a disk drive within a server), linkages, or even integration of the pre-compressed video and side-information into a single streaming data entity. Retention of separate data entities, (i.e. files) is generally preferred for compatibility reasons and to eliminate the overhead associated with encoding the side-information into the file and then extracting that information at a later time.

Delivery over the network occurs at a subsequent time, such as in response to a demand for a given pre-compressed video sequence, wherein the pre-compressed data and side-information are accessed from the storage media for transmission. A set of adaptive controls 24 is shown which retrieves the pre-compressed video 20 and adapts the transmission mechanism to optimize delivery of the packets in response to an RD-optimized policy 26 provided by a policy selection means 28. It will be appreciated that policy selection means 28 may be similarly implemented using any convenient form of digital logic circuitry or processor, such as one or more processing elements executing instructions retained in memory or within a data retention media.

The invention may be practiced following any arbitrary set of transport policies found within policy space 42. It is preferable, however, that low complexity policies be adopted, such as forward error correction (FEC), or automatic retransmission on request (ARQ), to simplify the policy decision space and reduce the computational overhead. For any given adaptation scheme there exists a policy space that details the operational choices the server may make in transporting the video data toward the receiver.

By way of example and not of limitation, a specific policy may determine how many parity check packets to send in the FEC system, or determine if and when the retransmission of a particular packet is to occur in the ARQ system. It may be generally considered that when a client requests delivery of a video stream, the server will seek to identify the optimum policy that minimizes the expected end-to-end distortion, possibly subject to cost constraints or tradeoffs, in response to the current network status and information about the packets being sent as contained in the collected side-information. It will be appreciated that distortion estimation is a critical determiner for optimally selecting transport policy, while cost estimations can be of similar importance depending on the transport application.

The pre-compressed video is delivered as packets 30 in an optimized delivery format over the lossy network 32, wherein received packets 34 are processed within a receiver 36 which generates a reconstructed signal 38. The optimization of the delivery format is based on the composition of the packets, the status of the network, and the techniques being utilized within receiver 36 for improving apparent QoS, such as employing error concealment techniques.

Policy selection means 28 receives network status information 40, and is preferably cognizant of the techniques utilized within receiver 36 for reconstructing the video signal. Policy selection means 28 is shown comprising a policy space 42 from which a distortion estimation module 44, and cost estimation model 46, draw policy information.

Distortion estimation module 44, as well as cost estimation model 46, may be implemented separately from policy selection means 28, such as by employing separate processor elements (i.e. microprocessors) or similar instruction execution means. Alternatively, other forms of digital logic processing circuitry, such as complex logic arrays and custom ASICs, can be configured for performing distortion estimations or cost estimations based on receipt of both side-information and network status information so that distortion estimates and/or cost estimates, respectively, may be determined as the pre-compressed data stream is being transmitted.

It should be appreciated that policy selection means 28 may be implemented in a number of different configurations without departing from the present invention. By way of example, and not of limitation, the policy decisions may be programmed into a distortion estimation routine for execution by an associated processing element. In some applications transmission cost estimations may be optional, subject to predetermined levels, or subsumed under distortion estimation processes without departing from the teachings of the present invention.

It will be appreciated that without knowledge of the techniques utilized within receiver 36, the adaptation of transport tools 24 may be suboptimal as they would not take into account any distortion-reduction techniques utilized within the receiver. The typical receiver, for example, includes a decoder which upon detecting lost packets attempts to approximate any missing information, such as by using error concealment techniques. By failing to take advantage of the error corrections being performed at receiver 36, the adaptive transport tool 24 may select overly conservative protection modes resulting in unnecessary performance degradations.

The generality of the above delivery framework should be recognized, as this framework may be generally employed with any arbitrary form of data stream compression, online adaptation, network status monitoring, error concealment, or numerous other variable attributes. The framework may be utilized in conventional gateway and server applications or may equally serve in wireline and/or wireless transcoding applications and multicast routing applications. The present methods of the invention are therefore applicable as a general end-to-end rate-distortion (RD) solution to the fundamental problem that arises in these applications, and others, when transporting pre-compressed video streams.

1.2 Difficulties in Estimating the Distortion

Generation of end-to-end distortion estimates based on the current network status for packets being transported is a fundamental requirement when attempting to provide robust transmission of video, or similar media streams, over a lossy network. The present invention overcomes what has heretofore been a difficult, or even seemingly intractable, problem of optimizing transport over a lossy network for a pre-compressed video stream. One difficulty with solving the problem has been that all components of the system, from the pre-compression of video through to its reconstruction, affect the overall performance. Furthermore, the difficulty of solving the problem is exacerbated as a consequence of the network status, as generally embodied herein as the effective packet loss rate p, only being known at the time of transport. A number of factors influence the estimation of end-to-end distortion and the interactions between elements.

1.2.1 Inter-dependencies Due to Compression

The first factor to influence distortion estimation is the compression algorithm utilized within the encoder. The objective of compression is to represent the data with as few bits as possible, generally subject to a maximum allowed distortion. The encoder typically removes redundancies within the video stream, such as within the temporal, spatial, and/or frequency domains. As a consequence of removing these redundancies, inter-dependencies between source packets arise. Irrespective of which techniques or algorithms are utilized for encoding and packetizing the video content, a video sequence is typically partitioned into independently encoded and packetized groups of frames (GOF). Each of these groups of frames still encompasses dependencies between all of the data packets within each group of packets (GOP). Often one video frame is associated with each source packet.

Figure 2:
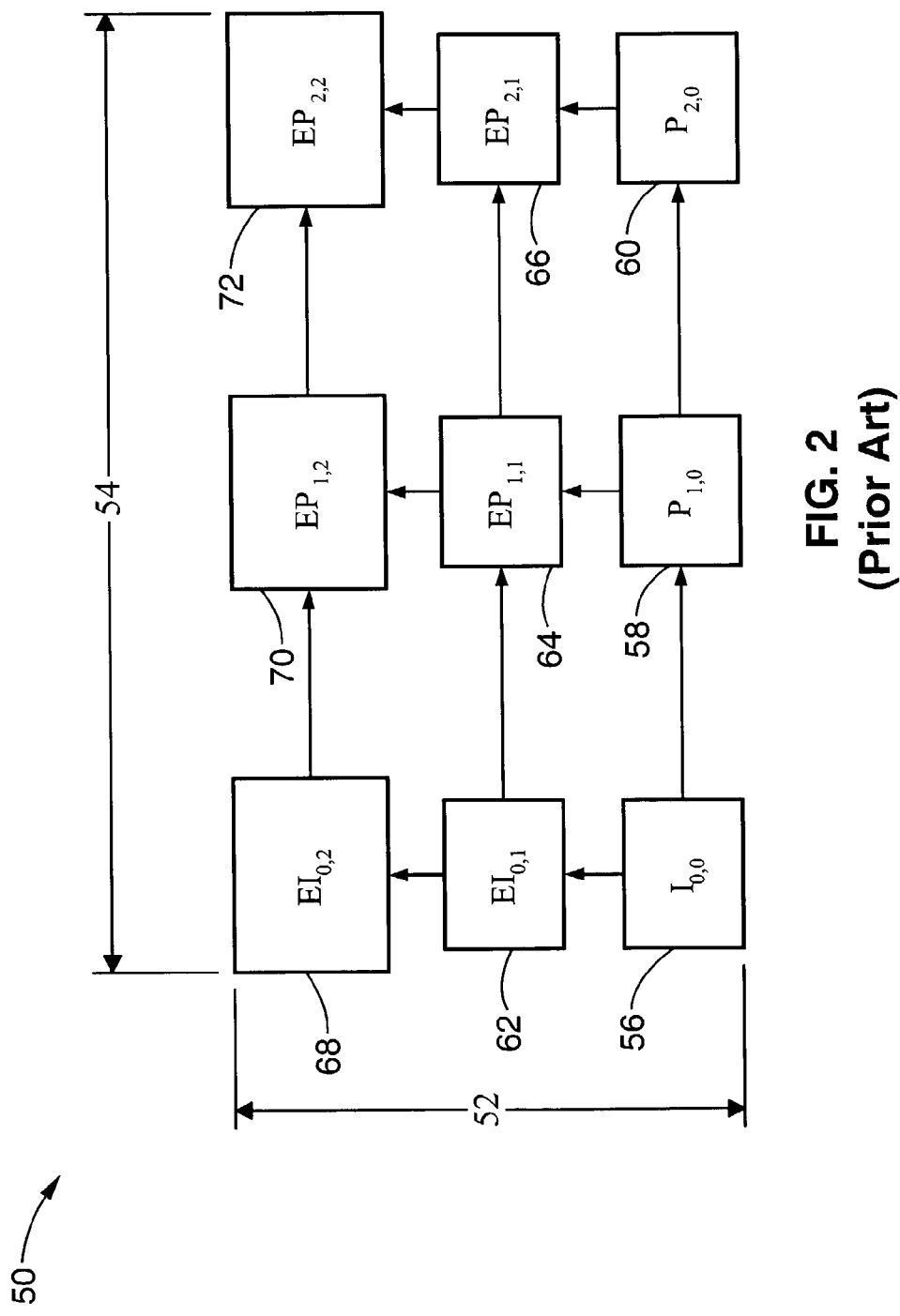
FIG. 2 is a diagram of the inter-dependencies within a scalable coding structure, such as found within the H.263+ video coding standard.

FIG. 2 depicts packet inter-dependencies within a scalable coding structure 50, such as found within a hybrid scalable variant of the H.263+ video coding standard. One video frame per packet is assumed for the sake of illustration. The use of spatial scalability within the coder, wherein the base layer and first enhancement layer are subsampled, and SNR scalability leads to dependencies 52 in the vertical direction. Motion compensation techniques utilized within the coder for removing temporal redundancy leads to the horizontal dependency 54 of inter-coded frames in the base layer (P) and the enhancement layer (EP).

The packets depicted comprise an initial frame of base layer 56 ($I_{0,0}$), followed by a first frame of base layer 58 ($P_{1,0}$), and a second frame of base layer 60 ($P_{2,0}$). A first enhancement layer is shown with an initial frame 62 ($EI_{0,1}$), followed by a first frame of the first enhancement layer 64 ($EP_{1,1}$), and a second frame of first enhancement layer 66 ($EP_{2,1}$). A second enhancement layer is shown with an initial frame 68 ($EI_{0,2}$), followed by a first frame of second enhancement layer 70 ($EP_{1,2}$), and a second frame of second enhancement layer 72 ($EP_{2,2}$).

These dependencies have been illustrated within this field of research using acyclic graphs as shown in the figure. Each node within the graph corresponds to a data unit, and an edge directed from any data unit l' to another data unit l corresponds to a dependence of data unit l on data unit l'. For example, the edge between $EI_{0,1}$ and $EP_{1,1}$ implies the dependence of $EP_{1,1}$ on $EI_{0,1}$. Therefore, the proper decoding of data unit $EI_{0,1}$ is a pre-requisite for the proper decoding of data unit $EP_{1,1}$, and a relationship between data units has been induced by the encoding that may be expressed in terms of ancestors and descendents. Consequently, if a set of data units is received by a client, only those data units whose ancestors have also been received can be decoded correctly. Again, considering FIG. 2 as an example, it will be appreciated that only when $I_{0,0}$, $P_{1,0}$, and $EI_{0,1}$ are all received, can $EP_{1,1}$ be decoded perfectly.

The importance of each packet should therefore be apparent wherein the total distortion must be properly determined not only by the direct contribution of its content, or lack thereof, but also by its influence on all of its descendents. It may be said that a packet having more descendents "carries more weight" in the estimation of distortion. However, this inter-dependency relationship is more complex than this and depends not only on the encoding relationships, but also on the effects of error concealment as may be performed at the decoder. A fully optimal transport strategy can not be determined unless the error corrective capability at the receiver is taken into account.

1.2.2 Error Concealment at the Receiver

Toward the goal of providing error resilient decoding, typical decoders include a form of error-concealment as a post-processing tool. By exploiting the correlations found in the temporal, spatial, and/or frequency domains the damage which results from lost packets may be significantly mitigated. The error concealment not only partially recovers lost content, but also mitigates the damage due to error propagation. If a packet with numerous descendents is adequately recovered by error concealment after loss, then its descendents may still be decoded with relatively minor degradation. The benefits of error concealment, however, add another layer of complexity to the already challenging problem of accurate end-to-end distortion estimation. Clearly, the corresponding effects of error concealment on the end-to-end distortion should be taken into account when providing an accurate, realistic, and practical estimator.

1.2.3 Channel Status at Delivery

Overall video quality as received over a network depends on the characteristics and statistics of the network. The amount of available bandwidth determines the amount of information that may be transmitted, while the packet loss rate and transmission delay influence the effective throughput. As a result of the substantial inter-dependencies in the source video bit-stream, the degree of deterioration due to packet loss and error propagation varies with the channel status. It will be appreciated that dynamic channel or network parameters are unavailable when the compressed bit-stream is generated, and that these values can vary widely over time. Consequently, a network monitoring strategy should be implemented so that network status may be continually fed back to the adaptive transport mechanism performing delivery operations.

1.2.4 Adaptation Strategy

The encoded data of a video stream is packetized into what may be referred to as "data units" for pre-compressed video delivery. These packets may be referred to as "source packets" to differentiate them from "redundant packets" and "transmitted packets". The redundant packets may be generated in a number of ways, including retransmission, or by parity check packets produced by FEC codes. The actual transmitted packets can be either source packets, redundant packets, or a combination of both through the use of interleaving. The selection of a transport-level delivery mechanism can have a significant impact on the amount of degradation exhibited by the decoder reproduction of the source information.

A convenient viewpoint for evaluating the performance is that of remaining at the source packet level and considering that the above resiliency mechanisms only modify the effective loss statistics for the source packets. It will be appreciated that this provides an equivalent view of degradation. This view is mathematically expressed by a mapping from the adaptive delivery policy $\pi$ to the effective packet loss rate p experienced by the source packet, given the channel packet loss rate (of the transmitted packet) $p_{ch}$ under specific circumstances. For example, a retransmission and delay model had been utilized for calculating packet loss rate, and loss rates for FEC codes have been calculated. The present method preferably utilizes effective packet loss rate p in deriving the estimator, which is subsequently described for use as the ultimate objective of optimizing the choice of delivery scheme $\pi$ within the RD-framework.

1.2.5 Complexity Requirement

Practical design considerations typically result in utilizing delivery system specifications that impose low complexity requirements on the distortion estimation procedure employed for selecting a delivery scheme from the policy space. The complexity is determined by the RD cost estimation per policy, and the size of the policy space. As a consequence of these inter-packet dependencies the policy space can be substantial. Therefore, use of a moderate to high complexity estimator generally results in prohibitive levels of overall complexity and reduces the practicality of design and utilization.

In view of the above, it will be appreciated that the present invention provides a low-complexity method for accurately estimating end-to-end distortion for a pre-compressed video stream, or other media stream, which is generally applicable with all compression and packetization techniques, channel conditions, and delivery schemes. The method of the invention can take into account all inter-packet dependencies as well as any error concealment performed at the decoder.

2. End-to-end Distortion Estimation

The problem with end-to-end distortion estimation for a system delivering pre-compressed video is now described in detail at an analytical level along with effective solutions that utilize low-order estimation algorithms.

2.1 Analysis Symbology

A number of the symbols utilized for distortion analysis are summarized below for quick reference.

| | |
|---|---|
| $\gamma_i$ | First-order partial derivative |
| $\gamma_{i,j}$ | Second-order partial derivative |

-continued

| | |
|---|---|
| $\pi$ | Adaptive delivery policy |
| $\Pi$ | Policy vector for a group of source packets |
| ADDE | Acyclic Dependent Distortion Estimation |
| ARQ | Automatic Retransmission on Request |
| b | Binary realization of delivery (0 = not, 1 = yes) |
| $b_i$ | random outcome of delivery denoted for packet i |
| B | Delivery Event vector for a group of source packets |
| BER | Bit Error Rate |
| c | Cost of a policy choice |
| d | Distortion for a pixel |
| D | Distortion, overall |
| $E_P\{D\}$ | Expected GOP distortion given PLR vector P |
| EP | Enhancement layer of P frame |
| f | value of a pixel in the original signal |
| $\tilde{f}$ | reconstructed pixel corresponding to f |
| FEC | Forward Error Correction |
| FODE | First-order Distortion Estimation |
| GOP | Groups Of Packets |
| i | Packet number |
| k | Index of the event |
| l | data unit |
| m | number of reference PLRs |
| N | Number of possible delivery events |
| PLR | Packet Loss Rate |
| p | Effective packet loss rate |
| $p_i$ | Effective packet loss rate of packet i |
| $\bar{p}_i$ | Effective packet loss rate of packet i for a reference PLR |
| $p_{ch}$ | Channel loss rate |
| P | Packet loss rate (PLR) vector |
| $\bar{P}$ | Reference packet loss rate (PLR) vector |
| P | Base Layer of P frame |
| QoS | Quality of Service |
| RD | Rate Distortion (Lagrangian rate-distortion) |
| SODE | Second-order Distortion Estimation |

2.2 Distortion Analysis

Although not necessary for practicing the invention, it can be generally considered that the compressed video is packetized into independent groups of pictures (GOP). Expected distortion for each GOP can be determined separately since no dependencies exist across GOPs. The distortion for all packets within a given GOP, however, must be calculated jointly as they may depend on one another due to prediction.

Let there be N source packets per GOP, and let $p_i$ denote the effective packet loss rate (PLR) of packet i. It should be noted that $p_i$ is a function of both the network condition and the resilience strategy used for this packet. As a result the PLR vector for the entire GOP is given by:

$$P=\{p_0, p_1, \ldots, p_i, \ldots, p_{N-1}\} \quad (1)$$

It will be recognized that packet i may be either received correctly, or considered as lost. The random outcome of packet delivery is denoted by variable $b_i$, which is a binary random variable that takes the value of 1 with probability $p_i$. The delivery status of the entire GOP is denoted by the binary random vector B. A total of $2^N$ possible delivery events exist for each GOP. A particular event vector of the entire GOP is the realization of the delivery status vector and is represented by:

$$B^{(k)}=\{b_0^{(k)}, b_1^{(k)}, \ldots, b_i^{(k)}, \ldots, b_{N-1}^{(k)}\} \quad (2)$$

where k denotes the index of the event ($k=0,2,\ldots,2^N-1$), and binary digit $b_i^{(k)}$ denotes the status of the ith packet in the kth event. The packet is received correctly if $b_i^{(k)}=0$ and lost if $b_i^{(k)}=1$. Assuming the packets are lost independently, the probability of the kth event vector $B^{(k)}$ is given by:

$$p^{(k)} = \prod_{i=0}^{N-1} (1-p_i)^{(1-b_i^{(k)})} p_i^{b_i^{(k)}} \qquad (3)$$

Let f denote the value of some pixel in the original video. Let f̃ denote the corresponding reconstructed pixel at the receiver. It should be noted that f̃ is a random variable for the transmitter since it depends on the effects of packet loss, error concealment, and error propagation which are unknown to the transmitter. It is also important to note, however, that the decoder reconstruction is completely determined if the event vector of the entire GOP is given. Thus, the decoder reconstruction for the pixel under the kth event, f̃$^{(k)}$, can be exactly determined. The end-to-end distortion of this pixel under the kth event is given by:

$$d^{(k)} = (f - \tilde{f}^{(k)})^2 \qquad (4)$$

The overall distortion of the GOP under the kth event is:

$$D^{(k)} = \sum_{f \in GOP} d^{(k)} \qquad (5)$$

During the compression phase the encoder can compute $D^{(k)}$ for $k=1,2,\ldots,2^N$, and store these quantities as side-information, such as at the server.

It is not known, however, which delivery event occurred at the transmitter. The expected GOP distortion given the PLR vector P (which depends on the current channel status and delivery strategy) can be determined as follows:

$$E_P\{D\} = \sum_{k=0}^{2^N-1} p^{(k)} D^{(k)} \qquad (6)$$

$$= \sum_{k=0}^{2^N-1} \left( \prod_{i=0}^{N-1} (1-p_i)^{(1-b_i^{(k)})} p_i^{b_i^{(k)}} \right) D^{(k)}$$

It should be appreciated that this expectation is exact, not given by approximation, and that it considers all possible error events, and takes into account the effects of compression, packet loss, error propagation, and error concealment. In practical applications, however, this computation has at least two major drawbacks. First, the $2^N$ real values for $D^{(k)}$ need to be stored as side-information for each GOP, which imposes a major storage requirement. Second, the expected distortion is a complicated function of the individual packet loss rate as seen in Eq. 6. Therefore, the use of this metric to optimize error resilience strategies involves both a high computational complexity and a large storage requirement.

2.3 First-order Approximation

A simple equation is now derived as an approximation to the end-to-end distortion estimate. A preferred estimation approximation should result in a substantial reduction in both computational complexity and the amount of side-information to be retained, while incurring only a minor loss of accuracy.

As the exact computation of end-to-end distortion in Eq. 6 is polynomial in the PLR vector, it can be approximated by its Taylor expansion, which is performed herein about a particular reference PLR vector.

$$\bar{P} = \{\bar{p}_0, \bar{p}_1, \ldots, \bar{p}_i, \ldots, \bar{p}_j, \ldots, \bar{p}_{N-1}\} \qquad (7)$$

For example $\bar{P}$ could correspond to the case where the loss probability is zero for all packets in the GOP. Since the expected distortion is an analytic function, its value can be expressed at any PLR vector $P = \{p_0, p_1, \ldots, p_i, \ldots, p_{N-1}\}$ by the Taylor expansion:

$$E_P\{D\} = E_{\bar{P}}\{D\} + \sum_{i=0}^{N-1} \frac{\partial E_P\{D\}}{\partial p_i} \bigg|_{P=\bar{P}} (p_i - \bar{p}_i) + \qquad (8)$$

$$\frac{1}{2!} \sum_{i=0}^{N-1} \sum_{j=0}^{N-1} \frac{\partial E_P\{D\}}{\partial p_i \partial p_j} \bigg|_{P=\bar{P}} (p_i - \bar{p}_i)(p_j - \bar{p}_j) +$$

$$\ldots + \frac{1}{N!} \sum_{i=0}^{N-1} \sum_{j=0}^{N-1} \cdots \sum_{l=0}^{N-1} \frac{\partial E_P\{D\}}{\partial p_i \partial p_j \cdots \partial p_l} \bigg|_{P=\bar{P}}$$

$$(p_i - \bar{p}_i)(p_j - \bar{p}_j) \cdots (p_l - \bar{p}_l)$$

It should also be noted that since Eq. 6 is a polynomial, there exists a finite number of terms in the complete Taylor expansion.

For a PLR vector P that is quite close to the reference PLR vector $\bar{P}$, it is reasonable to use only the first-order Taylor expansion as a good approximation:

$$\left( E_P\{D\} \approx E_{\bar{P}}\{D\} + \sum_{i=0}^{N-1} \frac{\partial E_P\{D\}}{\partial p_i} \bigg|_{P=\bar{P}} (p_i - \bar{p}_i) \right. \qquad (9)$$

$$= E_{\bar{P}}\{D\} + \sum_{i=0}^{N-1} \gamma_i \Delta p_i$$

where:

$$\Delta p_i = p_i - \bar{p}_i \qquad (10)$$

For empirical evaluation of the soundness of this approximation, the second-order Taylor expansion will also be considered, as follows.

$$E_P\{D\} \approx E_{\bar{P}}\{D\} + \sum_{i=0}^{N-1} \frac{\partial E_P\{D\}}{\partial p_i} \bigg|_{P=\bar{P}} (p_i - \bar{p}_i) + \qquad (11)$$

$$\frac{1}{2!} \sum_{i=0}^{N-1} \sum_{j=0}^{N-1} \frac{\partial E_P\{D\}}{\partial p_i} \bigg|_{P=\bar{P}} (p_i - \bar{p}_i)(p_j - \bar{p}_j)$$

$$= E_{\bar{P}}\{D\} + \sum_{i=0}^{N-1} \gamma_i \Delta p_i + \frac{1}{2!} \sum_{i=0}^{N-1} \sum_{j=0}^{N-1} \gamma_{i,j} \Delta p_i \Delta p_j$$

As the value $E_{\bar{P}}\{D\}$ could be readily pre-calculated for any given reference $\bar{P}$ via Eq. 6, the only task remaining is that of deriving a practical method for computing the first (and optionally second) order partial derivatives.

$$\left( \left( \gamma_i = \frac{\partial E_P\{D\}}{\partial p_i} \right) \right)_{P=\bar{P}} \qquad (12)$$

$$\gamma_{i,j} = \frac{\partial^2 E_P\{D\}}{\partial p_i \partial p_j} \bigg|_{P=\bar{P}}$$

These partial derivatives can be readily pre-calculated for any given reference vector $\overline{P}$, wherein Eq. 6 can be rewritten as:

$$E_P\{D\} = (1-p_i)E_P\{D|b_i=0\} + p_i E_P\{D|b_i=1\} \quad (13)$$

The first-order partial derivatives can thus be calculated as:

$$\left(\gamma_i = \frac{\partial}{\partial p_i} E_P\{D\}\right)\bigg|_{P=\overline{P}} \quad (14)$$

$$\left(= \frac{\partial}{\partial p_i}[(1-p_i)E_P\{D|b_i=0\} - p_i E_P\{D|b_i=1\}]\right)\bigg|_{P=\overline{P}}$$

$$= E_{\overline{P}}\{D|b_i=1\} - E_{\overline{P}}\{D|b_i=0\}$$

Similarly, utilizing Eq. 13, the equation of Eq. 6 can be further rewritten as:

$$E_P\{D\} = (1-p_i)[(1-p_j)E_P\{D|b_i=0, b_j=0\} + \quad (15)$$

$$p_j E_P\{D|b_i=0, b_j=1\}] + p_i[(1-p_j)E_P$$

$$\{D|b_i=1, b_j=0\} + p_j E_P\{D|b_i=1, b_j=1\}]$$

Hence the second-order partial derivatives can be easily calculated as:

$$\left(\gamma_{i,j} = \frac{\partial^2}{\partial p_i \partial p_j} E_P\{D\}\right)\bigg|_{P=\overline{P}} = E_{\overline{P}}\{D|b_i=1, b_j=1\} + \quad (16)$$

$$E_{\overline{P}}\{D|b_i=0, b_j=0\} -$$

$$E_{\overline{P}}\{D|b_i=1, b_j=0\} -$$

$$E_{\overline{P}}\{D|b_i=0, b_j=1\}$$

It should be appreciated that the appropriate choice of reference PLR vector $\overline{P}$ is essential to obtaining estimation accuracy and efficiency for a particular PLR vector P. The number of reference PLR vectors generally determines the amount of side-information that needs to be retained. In considering a first-order approximation, if m reference PLRs are utilized, then m(N+1) quantities per GOP must be stored. It should be appreciated that this quantity represents a significant side-information reduction in relation to the exact computation approach.

Furthermore, the first-order approximation reduces the overall complexity in the final RD-optimization for the adaptive delivery, which provides an important advantage. As shown in Eq. 9, the total expected distortion is now a linear function of the effective packet loss rate of each source packet. All inter-packet dependencies have been decoupled and subsumed by the partial derivatives $\gamma_i$, which simplifies the optimization procedure. Another important advantage of using an approximation is that the partial derivative calculation is general and hence the method is applicable to any data compression technique.

2.4 Generalized Description of Distortion Estimation Methods

Figure 3:
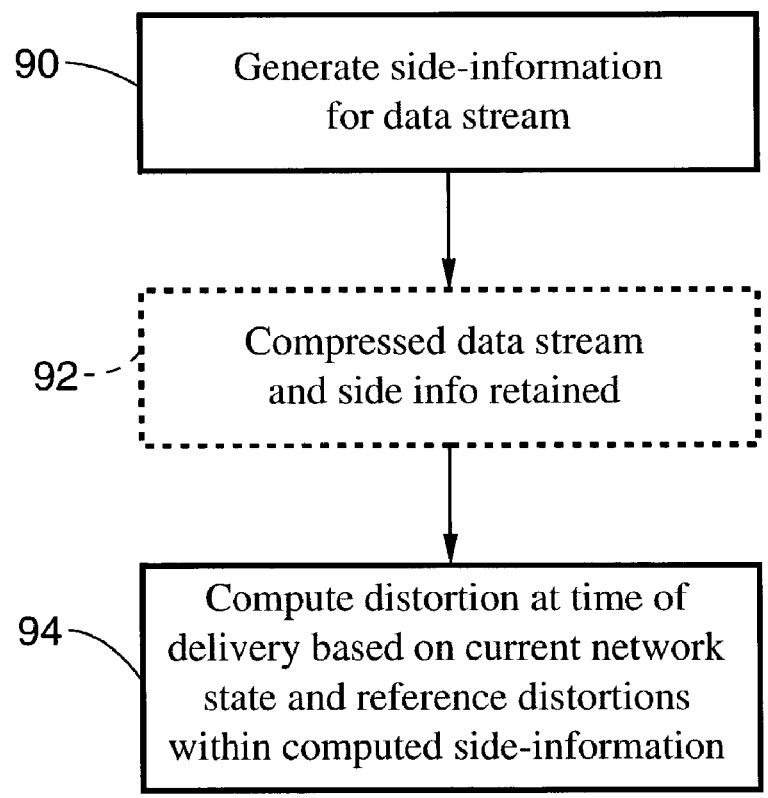
FIG. 3 is a flowchart of end-to-end distortion estimation at the time of delivery for a pre-compressed data stream according to an embodiment of the present invention.
Figure 4A:
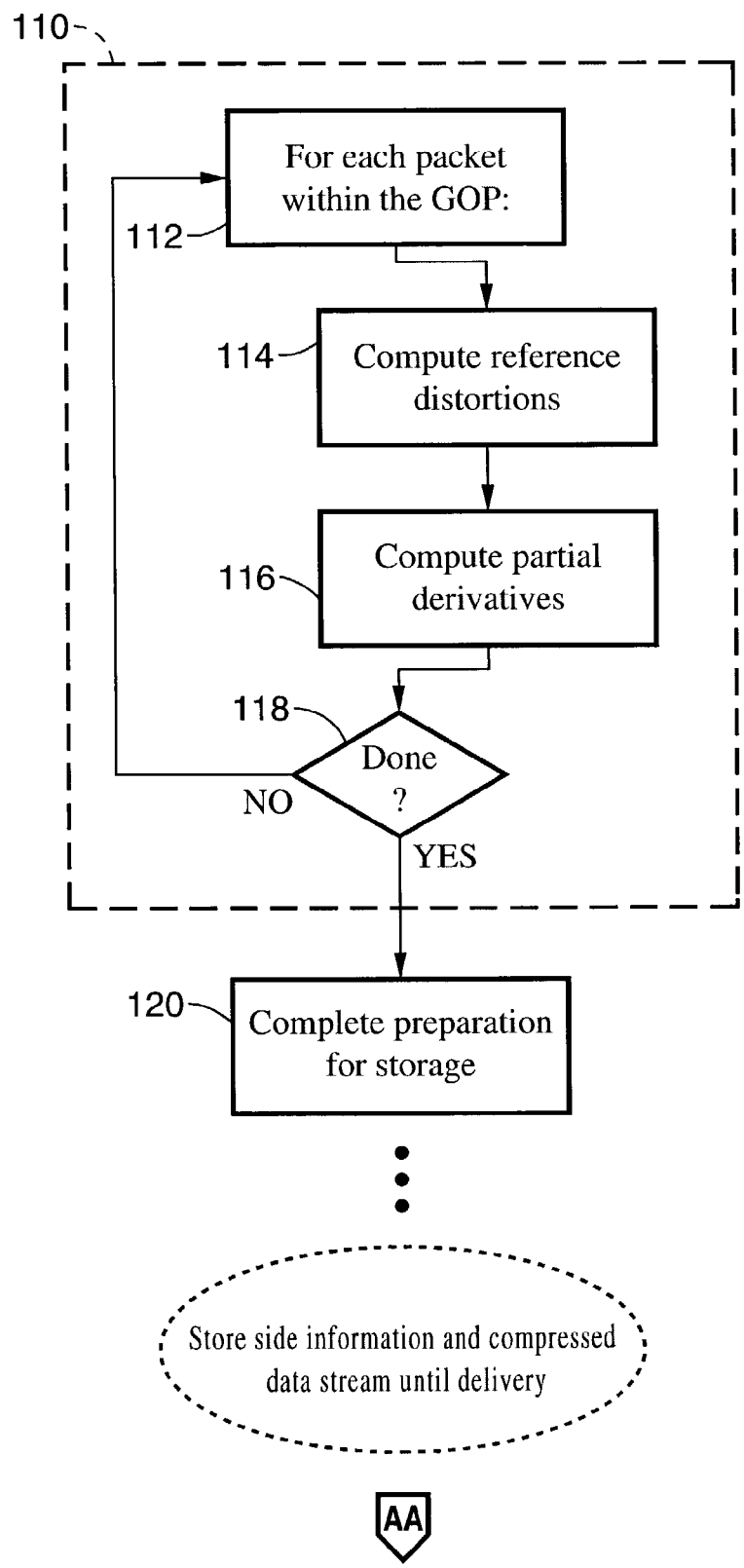
FIG. 4A is a flowchart of end-to-end distortion estimation for a pre-compressed data stream according to an embodiment of the present invention, showing side information computed during compression with distortion computation occurring at a subsequent time when the pre-compressed data stream is being delivered.
Figure 4B:
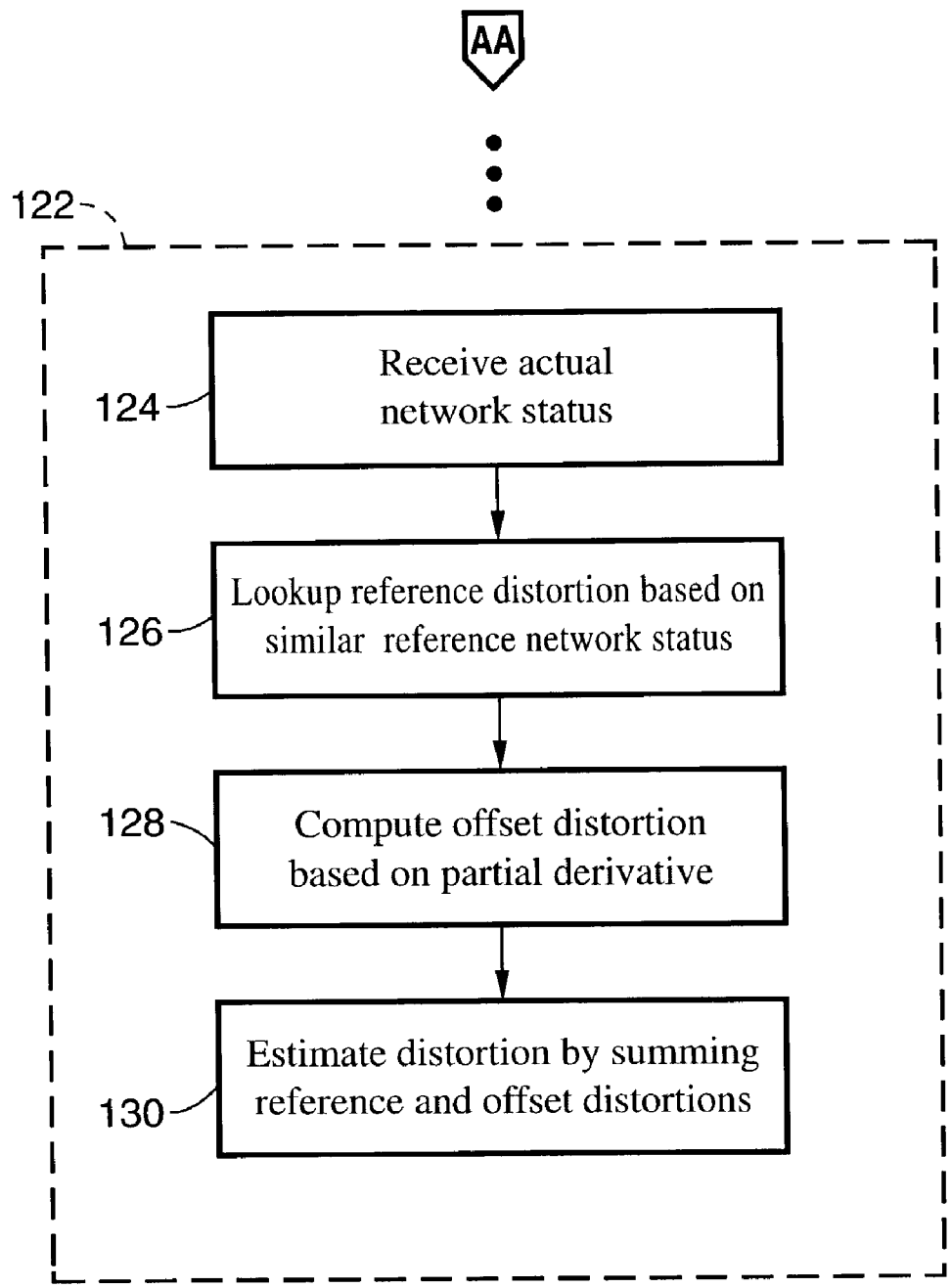
FIG. 4B is a flowchart which is a continuation of FIG. 4A.

Flowcharts of FIG. 3 and FIG. 4A, FIG. 4B, detail generalized steps within the methods of the present invention for estimating distortion.

The general method of computing distortion is outlined in FIG. 3, wherein side-information for a data stream is generated as the data stream is compressed as represented by block 90. It should be appreciated that generating the side-information within the compression routines can provide numerous benefits, and that the side-information must in any case be created before the original source data is lost, or is otherwise no longer available. The embodiments of the present invention describe the data stream as a video data stream, however, it should be realized that the method could be applied to other forms of data streams within which a need exists to estimate distortion for the pre-compressed data stream.

The compressed data stream along with the associated side-information, as generated based on the non-compressed original data stream, may be stored for any desired length of time prior to being transported over the network, as represented by block 92. It will be appreciated that this is not a step of the method (indicated by a dashed-line block), but merely describes a conventional intermediate operation which normally is found with the use of pre-compressed data streams. If no delay were anticipated between compression and transport, then the distortion estimation could be performed within the transport mechanism, based on the original uncompressed data stream, followed by immediate compression and transport according to known practices.

Distortion for the data stream is determined based on the receipt of actual network status information, herein given as packet loss rate, which drives reference distortion value selection and computation of any desired corrective offsets from the reference distortion at the time of transporting the data stream, as shown in block 94.

The selected reference distortion value may be corrected by utilizing partial derivative information stored within the side information to compute a corrective offset. It should be appreciated, however, that computing corrective offsets is optional and allows for improving estimation accuracy. It will be recognized that the selected reference distortion values from the side-information may be utilized directly if they are based on a reference network status that is sufficiently close to the actual network status, and/or that the given application does not require improved distortion accuracy estimates. Furthermore, distortion offsets may be determined within the present invention based on a computation involving other reference distortion values available within the side information, such as distortion values that are adjacent or nearby the selected reference distortion. Distortion may be estimated, therefore, within the present invention as a result of interpolation or other computation made in relation to one or more reference distortion values. It should also be appreciated that other forms of corrective side-information may be utilized in addition to, or as an alternative to, partial derivative information being retained within the side-information. In view of the teachings herein, these alternative mechanisms for improving distortion accuracy would be obvious to one skilled in the art.

The network status received at the time of transport may comprise packet loss rate information from the actual network at the time of delivery, and it could alternatively include additional network factors such as bandwidth. It is generally contemplated that network topology along with any error concealment schemes, or other factors effecting distortion estimation from the transmitting end of the network to the destination end, would be known at the time of generating the side-information to increase the accuracy of end-to-end distortion estimates. The actual network status value is received at the time of transmission for selecting a reference distortion value which was computed for that portion of the data stream, based on similar reference values for network status. By way of example, the actual network status value may be mapped into an index for accessing a discrete reference distortion value within an ordered list of values computed for that portion of the data stream.

FIG. 4A and FIG. 4B exemplify a mode of the embodiment outlined in FIG. 3. Referring first to FIG. 4A, side-information is generated as per block 110, whereafter the preparation for storage is completed, such as finishing any remaining data compression or side information computation, as per block 120. The compressed data stream may then be retained, such as on a network server, until the data stream is to be transported over the network, for instance in response to a user request for the data stream. At the time of transmission, the end-to-end distortion for the data stream which was compressed prior to commencing transport, and thereby "pre-compressed", is determined based on the side-information and the received network status information.

Aspects of generating side-information are detailed within block 110. A repetitive sequence, such as provided by a looping constraint, is performed as per block 112 for each packet within the group of packets (GOPs), wherein a plurality of reference distortions are generated as represented by block 114, such as by computation, corresponding to different values of network status that may occur. Partial derivatives are determined associated with each reference distortion as shown in block 116 to allow correcting the distortion estimation for the difference between the actual network status received and the selected reference distortion based on a slightly different value of network status utilized for generating the selected reference distortion value.

It should be appreciated that the method may be alternatively practiced, without departing from the teachings herein, by increasing the number of reference distortion values and eliminating the use of the partial derivatives. However, the magnitude of the estimation errors could increase dramatically unless the number of reference values of distortion were substantially increased. In addition, if multiple reference distortion values are available, the estimation accuracy may be improved by interopolation or a similar computation.

Returning to the figure, the loop continues until all side-information has been computed for the group of packets (GOP) as determined by block 118, after which any remaining preparations for storage are completed as represented by block 120. The compressed data stream along with the associated side-information may then be stored for any desired length of time awaiting delivery.

Referring now to FIG. 4B, as a continuation of FIG. 4A, a time of delivery block 122 is shown comprising block 124 representing the receipt of network status, which may comprise a packet loss rate, and/or similar information correlating with overall end-to-end distortion for the network. A reference value of distortion is found as per block 126, such as by using a lookup function, in the side-information based on the similarity between the actual network status received during data stream transport and the network status conditions under which the reference distortion values were generated. The actual network status value may be utilized in a number of ways, known to those of ordinary skill in the art, for selecting reference distortion values computed for similar network status conditions. By way of example and not of limitation, for the case of the network status value comprising a packet loss rate, the packet loss rate may be mapped into an index for selecting the reference value of distortion which was computed based on the closest match with the actual packet loss rate value received for the network.

Typically, the network status value will not exactly correspond to the reference network status utilized for computing the reference value of distortion, wherein a correction of the selected reference distortion value can be performed, if desired, to increase distortion estimation accuracy. The partial derivative associated with the selected value is preferably utilized for determining an offset value of distortion, as represented by block 128, to correct for the difference between the actual and selected reference network status information when the reference distortion value and offset distortion value are summed as per block 130.

The present embodiment describes computing a distortion offset based on information contained within the side-information, being exemplified herein as a partial derivative. However, as described previously, correcting the reference distortion value is optional and may be performed by alternative means without departing from the teachings of the present invention. Distortion estimation accuracy may be increased, for example, by employing interpolation between two or more reference distortion values while accounting for their respective partial derivatives.

2.5 Simulations to Evaluate Estimator Performance

The accuracy of the first-order distortion estimator (FODE) in both layered, and non-layered systems, was simulated. The single layer (non-layered) system is generally considered to have only horizontal dependencies, while a multi-layered (scalable) system includes inter-dependencies occurring along both the horizontal and vertical directions.

The source video bit-streams for the simulations were generated by a standard H.263+ codec. The decoder is considered to utilize adjacent lower layer reconstruction if any enhancement layer packet is lost, or replaces the lost base layer packet with information in the previous frame. The first-order partial derivatives were pre-computed and stored as side-information which can be utilized for estimating the distortion levels at different PLR vectors. These estimates were compared to actual distortion values of reconstructed video at the receiver, and averaged over fifty (50) realizations of the network under the same PLR conditions. To provide a comparative basis, the results of an "acyclic dependent distortion estimation" (ADDE) algorithm are described in which the packets are assumed to be decodable only after all of its ancestors have arrived at the receiver. The probability of this event being given by $(1-p_l)\Pi_{l'}(1-p_{l'})$, where the loss rate for packet l is $p_l$ and all packets l' are ancestors of packet l. The error concealment and its effect on the mitigation of error propagation are not accounted for.

In the case of the single layer system the "all-zeros" reference PLR may be utilized for the Taylor expansion:

$$\overline{P}=\{0,0,\ldots,0,\ldots,0\} \quad (17)$$

This can be applied for practical applications, as the PLRs generally do not stray far from zero (0), with the actual loss rate for the Internet being well below twenty percent (20%). The performance of a second-order distortion estimator (SODE) was also considered within the simulation. For each GOP of N packets, a total of N partial derivatives for a FODE are required and $N+N(N-1)/2$ partial derivatives for a SODE.

The simulation implements both a single-FODE model wherein only the "all-zeroes" reference PLR vector is used and a multi-FODE model in which "zeroes-and-ones" vectors are also used according to the PLR distribution among layers. These additional reference PLRs are now needed to account for the case wherein enhancement layer packets are discarded at the transmitter to conserve bits. By way of example, the reference PLR vectors being utilized in the multi-FODE model for the three-layer system are:

$$\overline{P}_0=\{(0,0,0),(0,0,0),\ldots,(0,0,0,),\ldots,(0,0,0)\},$$

$$\overline{P}_1=\{(0,0,1),(0,0,1),\ldots,(0,0,1,),\ldots,(0,0,1)\},$$

$$\overline{P}_2=\{(0,1,1),(0,1,1),\ldots,(0,1,1),\ldots,(0,1,1)\} \quad (18)$$

The result is N partial derivatives for the single-FODE model and mN partial derivatives for the multi-FODE model in a system of m layers.

Figure 5:
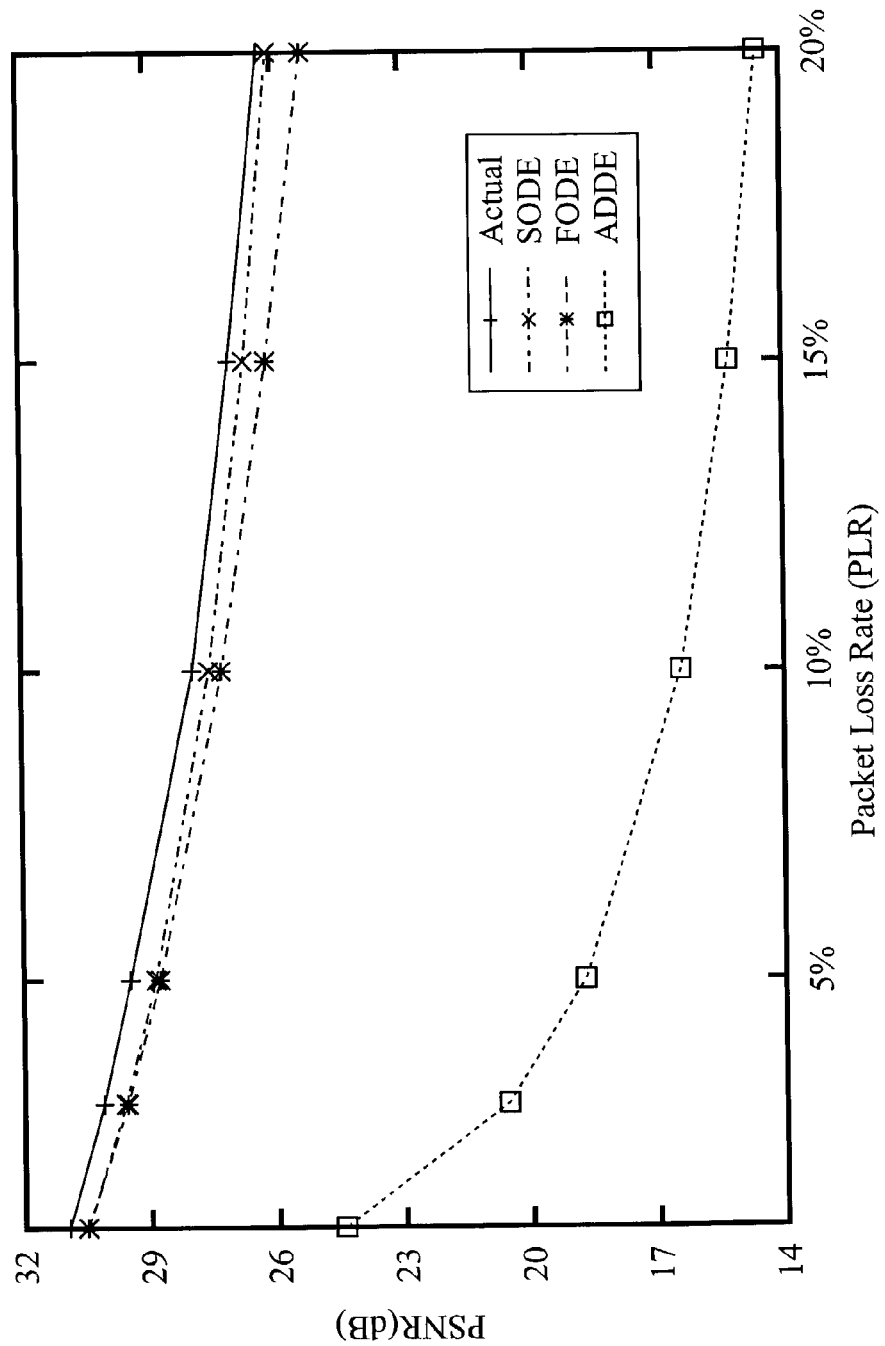
FIG. 5 is a plot of estimation accuracy (dB) for different estimation methods over a range of packet loss rates.
Figure 6:
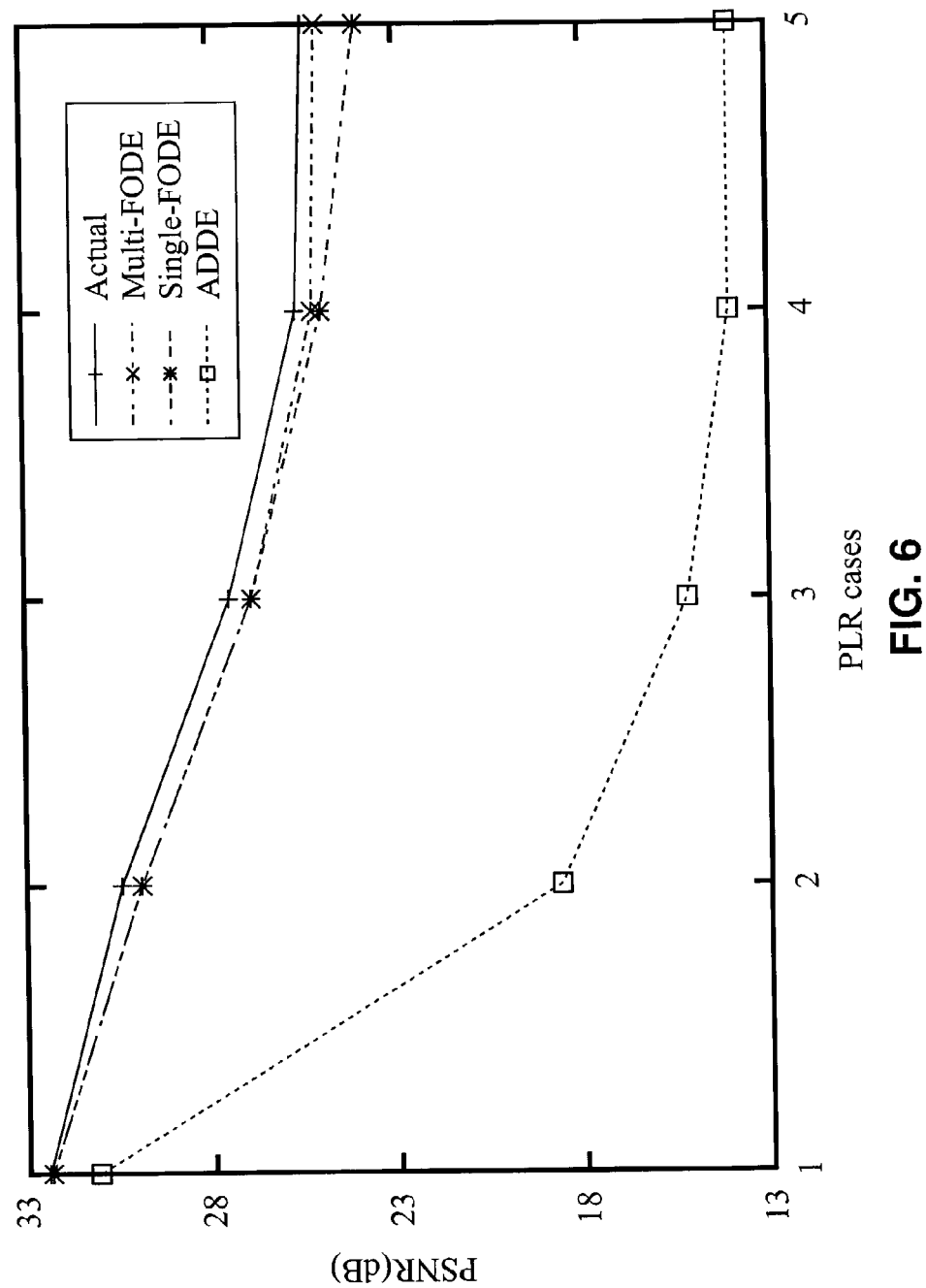
FIG. 6 is a plot of estimation accuracy (dB) for different estimation methods over five packet loss situations for a QCIF "carphone" sequence with a three layer bit-stream at 32/64/96 kbps at 10 fps.
Figure 7:
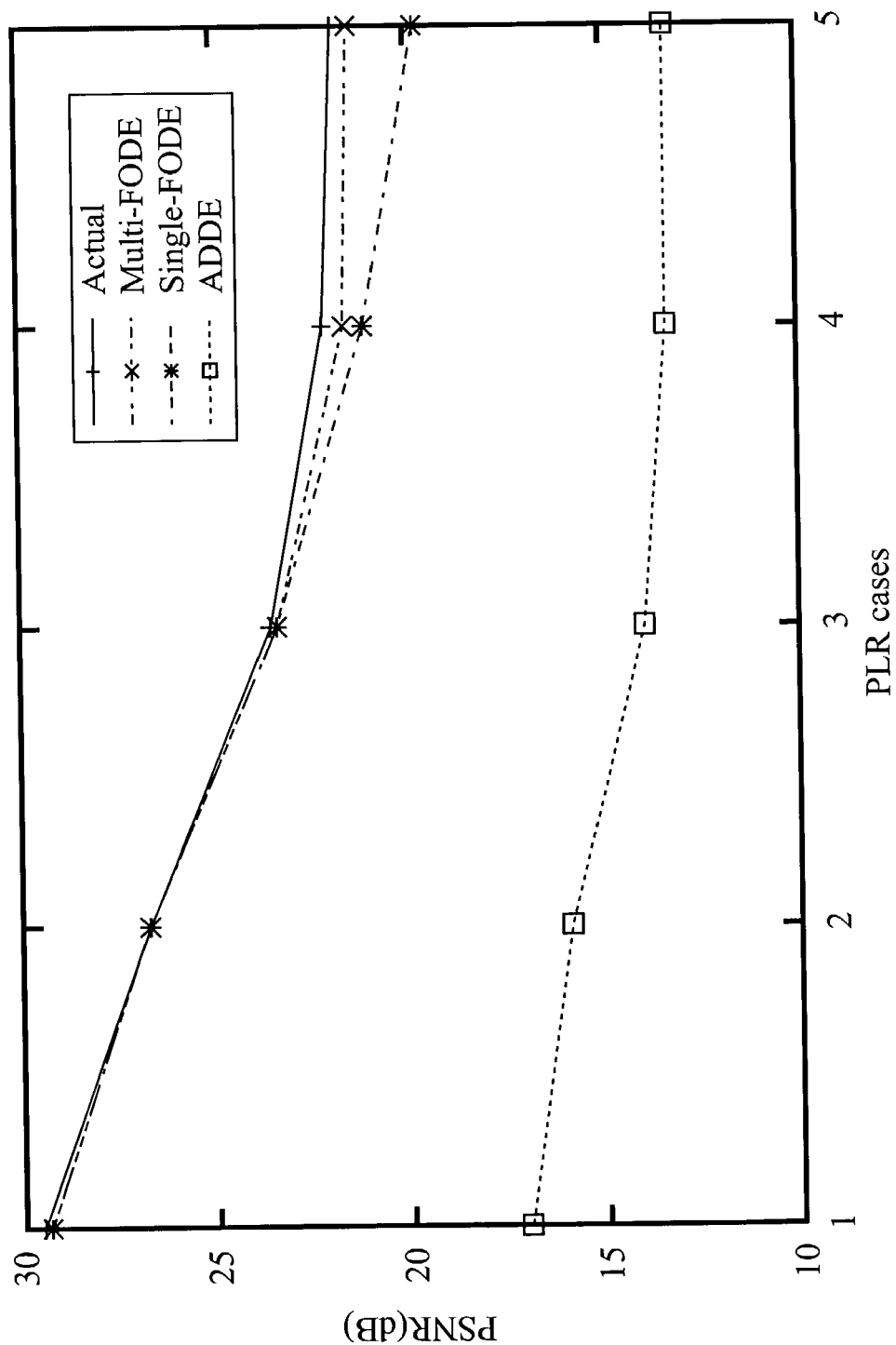
FIG. 7 is a plot of estimation accuracy (dB) for different estimation methods over five packet loss situations for a CIF sequence "LTS" with a three layer bit-stream at 100/200/400 kbps at 10 fps.

FIG. 5 through FIG. 7 illustrate estimation accuracy (dB) for different estimation methods over a range of packet loss conditions. FIG. 5 depicts the results for QCIF sequence "carphone" in a single layer system at 32 kbps for 10 fps. FIG. 6 depicts the results from the same sequence as in FIG. 7, but for a three-layer bit-stream at 32 kbps, 64 kbps, and 96 kbps at 10 fps. The results for a CIF sequence "LTS" for a three-layer bit-stream at 100 kbps, 200 kbps, and 400 kbps for 10 fps are depicted in FIG. 7. Referring to FIG. 6 and FIG. 7, the packet loss rates for the base layer, first enhancement layer, and second enhancement layer under different cases in (b) and (c) are: Case 1 (0%, 5%, 10%), case 2 (1%, 3%, 5%), case 3 (3%, 8%, 15%), case 4 (5%, 10%, 95%), and case 5 (5%, 95%, 95%).

Using the actual distortion value as a reference, it can be seen from the figures that FODE and SODE methods provide vastly improved accuracy in relation to a conventional ADDE method. The results substantiate the importance of accounting for the effects of error concealment within the system. The second-order correction by SODE provides only slightly better accuracy than FODE at larger packet loss rates, but that improvement is yielded at a higher computational complexity along with the necessary creation and storage of additional side-information at the time of compression. Similarly, in the multi-layer system, the multi-FODE provides slightly improved approximation over a single-FODE implementation when enhancement-layer packets are discarded, as found per case 4 and case 5 of FIG. 6, and FIG. 7. However, it will be appreciated that these gains are achieved at the cost of requiring additional side-information.

In summary, the simulation results illustrate that the FODE method is efficient in approximating the expected overall reconstruction distortion at the receiver. The first-order approximation with a single reference PLR is often sufficiently accurate and its simple linear form provides a computation of modest complexity that only requires a small amount of side-information to be created and retained.

3. RD-based Robust Delivery of Pre-Compressed Video

An optimized delivery method within the rate-distortion (RD) framework is now described as a general solution for various pre-compressed video streaming scenarios. The first-order distortion estimate (FODE) computation is integrated into this general rate-distortion framework to further optimize the error-resilient delivery method which is particular well suited for use with pre-compressed video. The optimized delivery method provides an optimized linear solution having a modest complexity and cost. The potential performance gains are illustrated in the simulation results, using the example of a scalable encoder coupled with unequal error protection through forward error control.

3.1 RD-based Error Resilient Delivery

Any adaptive error-resilience method provides a set of policy choices for each packet transported, as represented by:

$$\pi \in \{\pi^{(0)}, \pi^{(1)}, \ldots, \pi^{(S)}\}, \quad (19)$$

The policy choices are directly related to each of the delivery strategies that may be utilized by the system. The delivery strategy may determine whether or not to retransmit the current packet or not based on feedback information, or the strength of the error correction code. This implies that the effective loss probability for each packet is a function of the policy choice and the given channel loss rate $p_{ch}$. The cost of the policy choice c is usually measured by the total number of bits necessary for sending the packet, which is also a function of the delivery policy, as given by:

$$p=p(\pi),$$

$$c=c(\pi), \quad (20)$$

The policy vector for a group of (source) packets (GOP) is defined as:

$$\Pi=\{\pi_0, \pi_1, \ldots, \pi_i, \ldots, \pi_{N-1}\}. \quad (21)$$

Correspondingly, the effective packet loss rate (PLR) vector and the cost vector of the GOP are denoted by:

$$P(\Pi)=\{p_0(\pi_0), p_1(\pi_1), \ldots, p_i(\pi_i), \ldots, p_{N-1}(\pi_{N-1})\},$$

$$C(\Pi)=\{c_0(\pi_0), c_1(\pi_1), \ldots, c_i(\pi_i), \ldots, c_{N-1}(\pi_{N-1})\}. \quad (22)$$

If $\overline{P}$ is some fixed reference PLR vector, then the difference PLR vector is denoted by:

$$\Delta P(\Pi) = P(\Pi) - \overline{P},$$
$$= \{\Delta p_0(\pi_0), \Delta p_1(\pi_1), \ldots, \Delta p_1(\pi_1), \ldots, \Delta p_{N-1}(\pi_{N-1})\}.$$

Using FODE as derived earlier, the expected end-to-end distortion for a group of packets (GOP) can be estimated as:

$$E_{P(\Pi)}\{D\} = E_{\overline{P}}\{D\} + \sum_{i=0}^{N-1} \gamma_i \Delta p_i(\pi_i), \quad (23)$$

while the cost is simply the sum of the packet costs:

$$C(\prod) = \sum_{i=0}^{N-1} c_i(\pi_i), \quad (24)$$

The optimal adaptive delivery scheme should then choose the policy that minimizes the expected distortion $E_{P(\Pi)}\{D\}$ while satisfying the constraint on the cost $C(\Pi)$ according to:

$$\min_{\Pi} E_{P(\Pi)}\{D\}, \text{ subject to } C(\prod) \leq C_c. \quad (25)$$

This problem can be recast as an unconstrained minimization of the Lagrangian:

$$E_{P(\Pi)}\{D\} + \lambda C(\prod) = E_{\overline{P}}\{D\} + \sum_{i=0}^{N-1} \gamma_i \Delta p_i(\pi_i) + \lambda \sum_{i=0}^{N-1} c_i(\pi_i) \quad (26)$$

$$= E_{\overline{P}}\{D\} + \sum_{i=0}^{N-1} (\gamma_i \Delta p_i(\pi_i) + \lambda c_i(\pi_i)).$$

It is important to note the distortion estimate provided by FODE depends linearly on the PLR vector, and leads to a linear optimization problem. Therefore, from a theoretical standpoint, the policies can be chosen independently for each packet to minimize the Lagrangian cost. It should be recognized that any desired tradeoffs between distortion and cost can be facilitated by this method. From a practical standpoint the optimization can be performed with any structure employed by the adaptation schemes to group the packets, and provide a low computational complexity solution for the optimization procedure.

3.2 Generalized Description of RD-based Error Resilient Delivery Method

Figure 8:
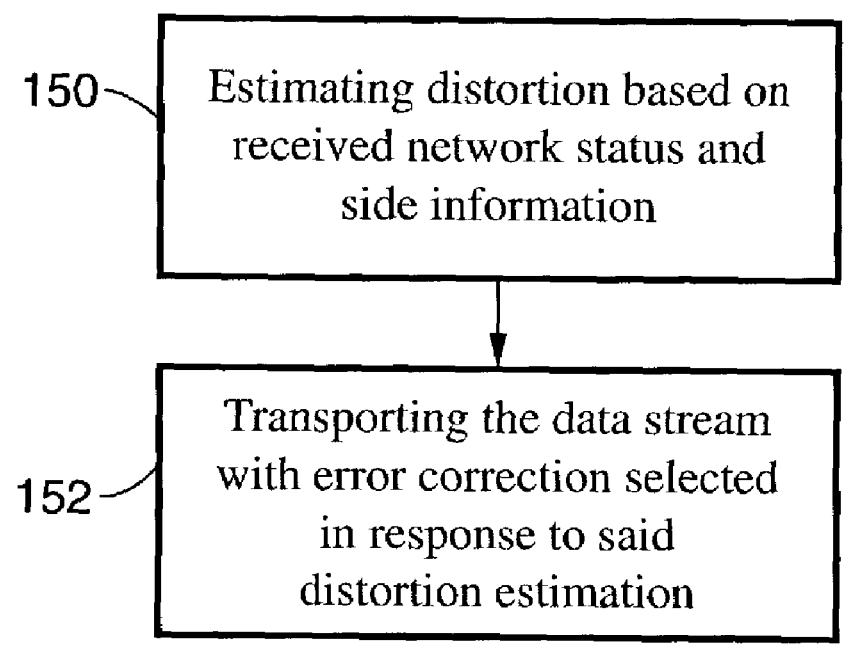
FIG. 8 is a flowchart of a method for providing adaptive transport of a pre-compressed data stream according to an embodiment of the present invention.
Figure 9:
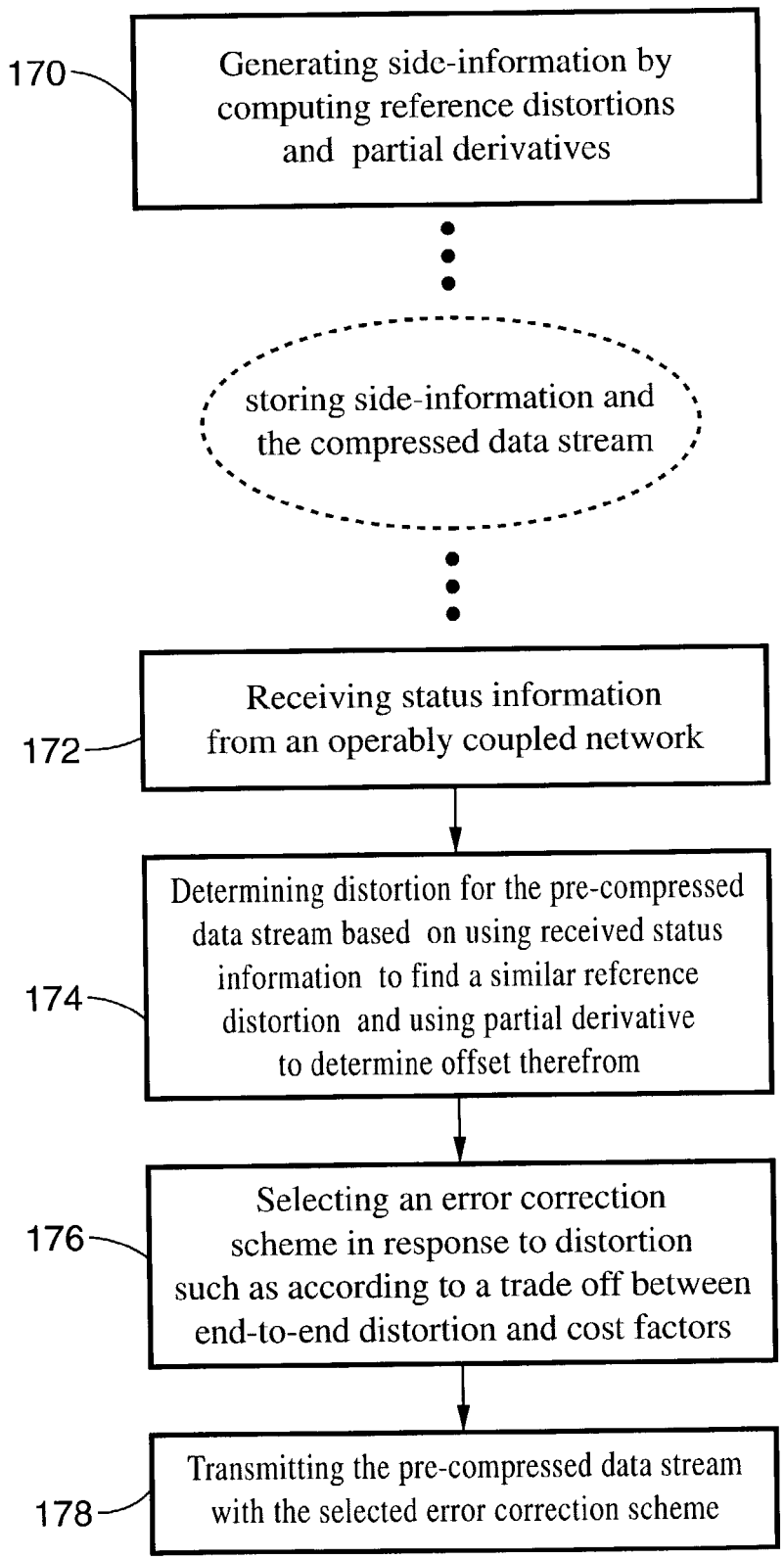
FIG. 9 is a flowchart of a method for providing adaptive transport of a pre-compressed data stream according to an embodiment of the present invention, detailing mechanisms for side-information generation and distortion estimation.

FIG. 8 and FIG. 9 detail the steps within the generalized methods for providing RD-based error resilient delivery of pre-compressed data streams that are particularly well suited for transporting pre-compressed video streams, or similar media streams.

Distortion estimation is depicted in block 150 of FIG. 8, based on the actual network status information, which is received at the time of transport of the data stream, in conjunction with the side-information generated for the data stream, such as at the time of compression. The distortion estimation may be performed according to the distortion estimation methods described earlier. The pre-compressed data stream is then transported over the network using an error correction scheme that is selected, as per block 152, based on the estimated value of distortion which was determined in block 150.

It will be appreciated that if cost were not a factor then there would be no need for compression and high overhead correction techniques could be utilized without regard for transmission cost, such as resending all packets. It should be appreciated therefore, that practical networks can be characterized as having some form of cost constraint. Achieving accurate distortion estimations, such as provided by the present invention, allows selecting error correction schemes, such as from within a range or set of error correction policy or schemes, so that the compressed data stream may be transported following any desired tradeoff between end-to-end distortion and transport cost. For example, in order to provide a desired QoS level at the destination end at the lowest transmission cost. Similarly, distortion may be minimized by selecting the best error correction scheme that fits within a given cost guideline, such as a within maximum allowable transmission cost parameter.

FIG. 9 exemplifies resilient error delivery, detailing aspects of an embodiment which utilize the distortion estimation method of FIG. 4A and FIG. 4B. In block 170 the side-information is generated by determining (typically by computation) the reference distortions, and preferably the associated partial derivatives, for a given data stream. The side-information is computed for the uncompressed data stream, and is preferably performed at the time of compression. The compressed data stream and side-information are retained until delivery, such as on a hard drive or other data retention media which may be within a server connected upon the network, or otherwise retained for later transport over the network.

When the data stream is to be transported over the network, status information for the network, such as packet loss rate, is received as represented by block 172. Distortion is then estimated as per block 174 for the data stream. The estimation is based on using the actual network status information for finding one or more reference distortion values, within the set of side information as generated for reference network status values that are similar to (i.e. closest to) the received value for the actual network status. To increase accuracy, the selected values of reference distortion can be improved by using the partial derivatives to determine an offset which corrects for the difference between the actual network status and the reference network status value for which the selected reference distortion value was selected.

The estimated distortion is then utilized for selecting an error correction scheme that provides the most appropriate tradeoffs between end-to-end distortion and cost factors. It will be appreciated that tradeoffs between distortion and cost may be decided in any number of ways without departing from the teachings of the present invention. For example, an error remediation mechanism may be selected to achieve the least end-to-end distortion within a given maximum cost value, or a minimum cost solution may be desired that yields an end-to-end distortion that does not exceed a given maximum value of distortion. Additional tradeoffs between cost and distortion may be created based on the needs of the application. These tradeoffs may follow either predetermined or dynamic considerations. Finally, the pre-compressed data stream is transmitted using the selected error correction scheme as represented in block 178.

3.3 Simulation of RD-based Delivery Method

A delivery system of layered coding was simulated with unequal transport prioritization. The system consisted of a fully standard-compatible layered source coding for the pre-compression of the video signal, and unequal error protection through FEC on the packets of different layers at the time of delivery. The simulation considered both the packet-erasure channel along with the bit-error channel, and cross-packet FEC codes and within-packet FEC codes for the respective codes.

3.3.1 Layered Source Coding

As previously described, simple operations are preferred when executing an adaptive delivery scheme so that a low operational complexity may be attained. Scalable source coding techniques are advantageous as they simplify adaptations at the transport level during delivery. They produce embedded or layered bit-streams which allow decoding at multiple rates, hence bandwidth adaptation may be easily and naturally performed by utilizing simple packet filtering operations. Transport prioritization is also naturally implemented, since the base layer must be available at the receivers in order to decode the enhancement layers.

3.3.2 Unequal Error Protection Through FEC

A primary goal of unequal error protection schemes is to take advantage of the varying significance of source components, or differing levels of error sensitivity, wherein added protection is applied to important source components while still remaining within a prescribed rate budget.

A number of traditional error control coding schemes exist which may be utilized in practicing the invention. One such set of schemes are FEC-based techniques that have been widely examined in the video communications literature, and which at the time of this writing have been considered by the IETF for supporting transport of real-time media. Unequal error protection through FEC is considered in the simulation for two types of channels, consisting of packet-erasure channel and bit-error channel.

Figure 10:
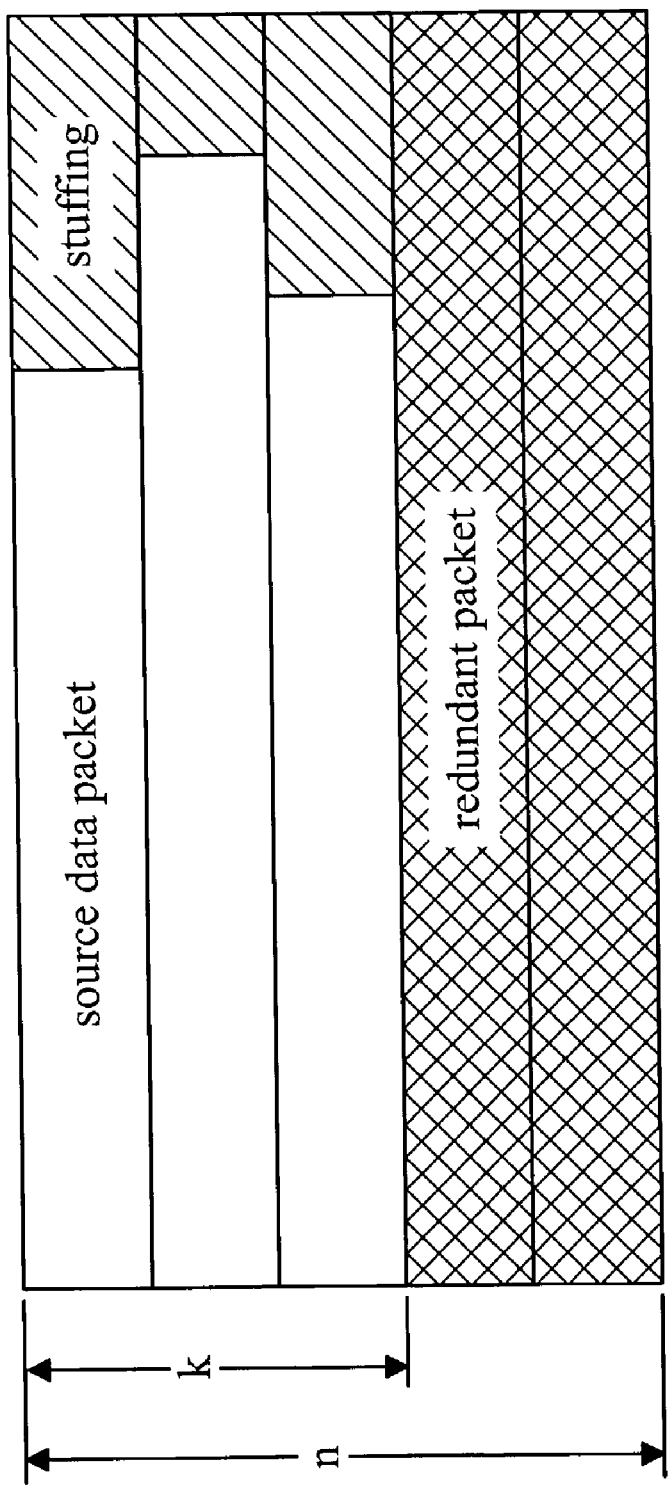
FIG. 10 is a diagram of a packet sequence for generating forward error correction (FEC) for cross-packet (inter-packet) FEC.

FIG. 10 depicts a layered cross-packet FEC code. In packet-erasure channels, such as the best-effort IP networks, the entire packet is either received perfectly intact and on time, or considered as "erased" if the intermediate routers discard it or if it arrives too late. In this situation, the "cross-packet" FEC code, as represented by the figure, is utilized for generating the redundant transmitted packets. By way of example, the present simulation will adopt Reed-Soloman (RS) codes, which comprise maximum distance separable block codes which may be denoted by a pair (n,k) where n is the block length and k is the number of source symbols. When using a systematic code, it is preferred that the convention be adopted that the first k of the n encoded symbols are the source symbols, and the remaining n–k symbols are redundant. It should be appreciated that in packet-erasure channels, those codes possess the property that they can exactly recover the k source symbols from any k subset of the n symbols. The actual loss probability for the source symbol reduces from $p_{ch}$ to $$p = \sum_{i=1}^{k-1} \binom{n}{i}(1-p_{ch})^i p_{ch}^{n-i}$$

while bit rate increases by a factor of n/k.

Figure 11:
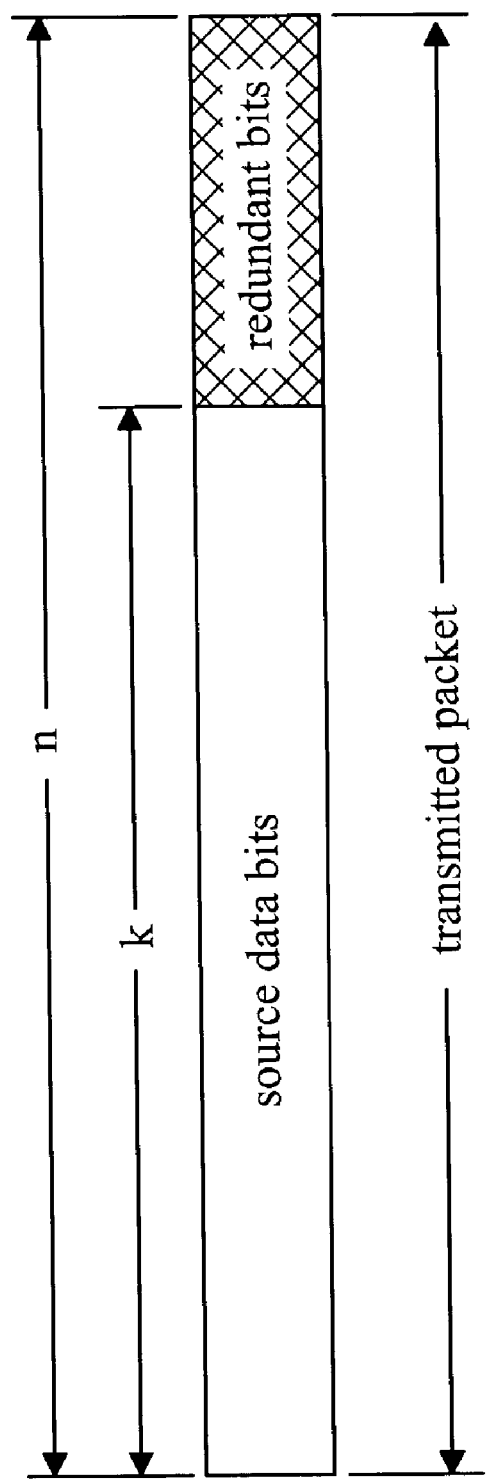
FIG. 11 is a diagram of a packet sequence for generating forward error correction (FEC) for within-packet (intra-packet) FEC.

Considering a bit-error channel, such as a wireless channel, it will be appreciated that packet corruption is principally caused by random bit errors. Therefore, the packet loss rate can be reduced by inserting redundant bits into each packet, as shown in FIG. 11. The rate-compatible punctured convolution (RCPC) code is utilized in view of its flexibility to provide unequal error protection and beneficial error correction performance. Furthermore, RCPC codes are adopted in various communication standards, such as within level 3 of H.223, or the H.324 annex C (mobile multiplexor) as a part of the mobile version of H.324.

3.3.3 Simulation Results of Layered Bit-streams

Simulations were performed that generated five-layer bit-streams for the QCIF sequence "carphone" and the CIF sequence "LTS". Three online delivery schemes, M-FODE-RD, S-FODE-RD, and fixed UEP, were compared within the simulations. The M-FODE-RD scheme is an RD-optimized scheme using the previously described multi-FODE model. The S-FODE-RD comprises only the single-FODE model. Both the single-FODE and multi-FODE models dynamically select a preferred error protection code (n,k), from a set of values n for a fixed k, to minimize the RD cost for packets within each layer. The fixed UEP scheme is utilized on each layer and provides more protection to lower layers, through RS and RCPC codes (fixed N). It should be noted that while the first two schemes can adapt to any rate constraint, the fixed-N scheme can only work with a number of specific rates. The performance of an unprotected source bit-stream (Src) is presented as a reference.

The three bit-streams generated by these schemes are subject to the same time-varying channels with PLR in the range from about one percent to about twenty percent (1%-20%) in the packet-erasure channel and BER in the range of from approximately $2 \times 10^{-6}$ to approximately $5 \times 10^{-3}$ in the bit error channel.

Figure 12:
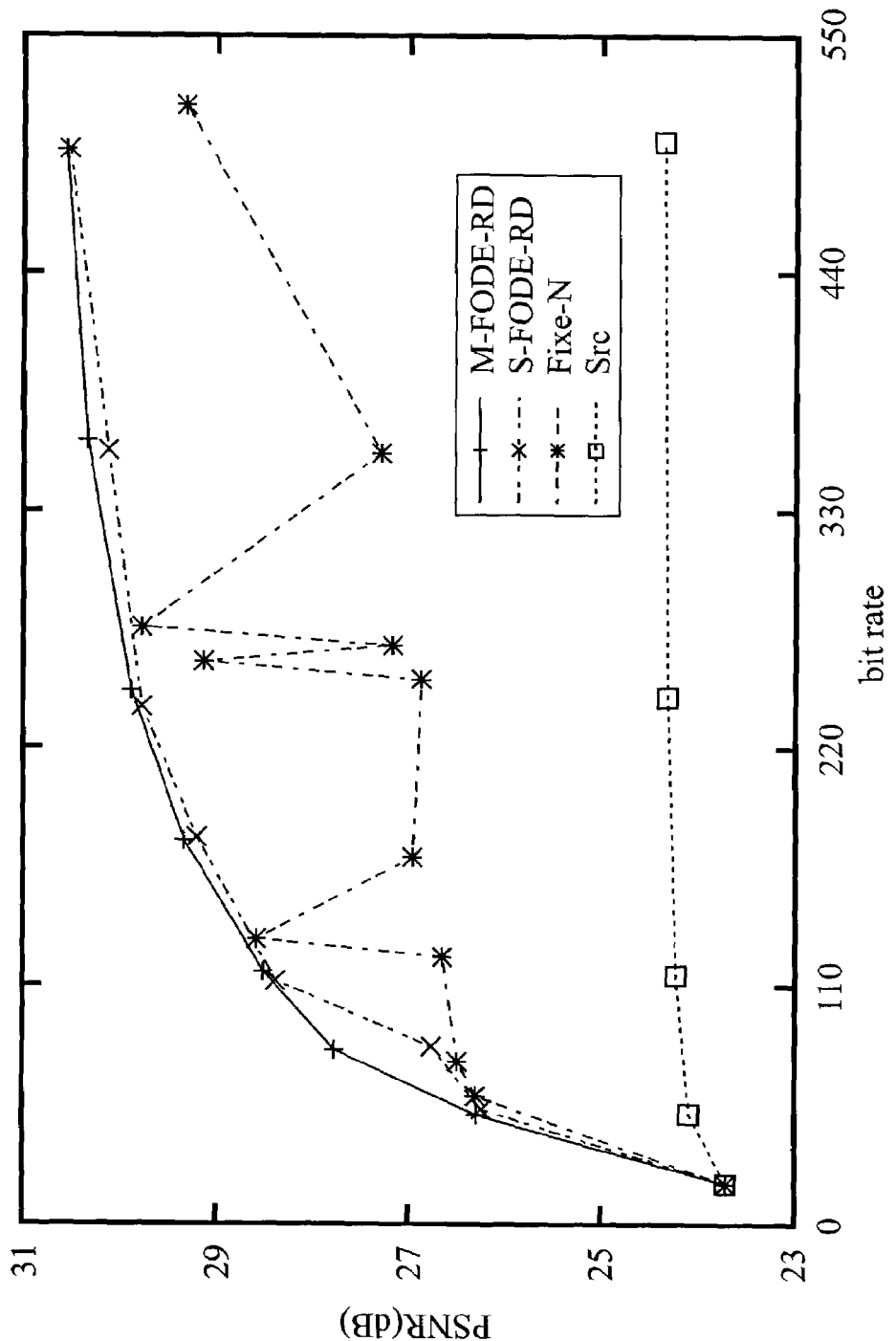
FIG. 12 is a plot of distortion (dB) for sending the QCIF sequence "carphone" in packet erasure channel at 10 fps in a 5 layer bit-stream at 16/64/112/240/496 kbps.
Figure 13:
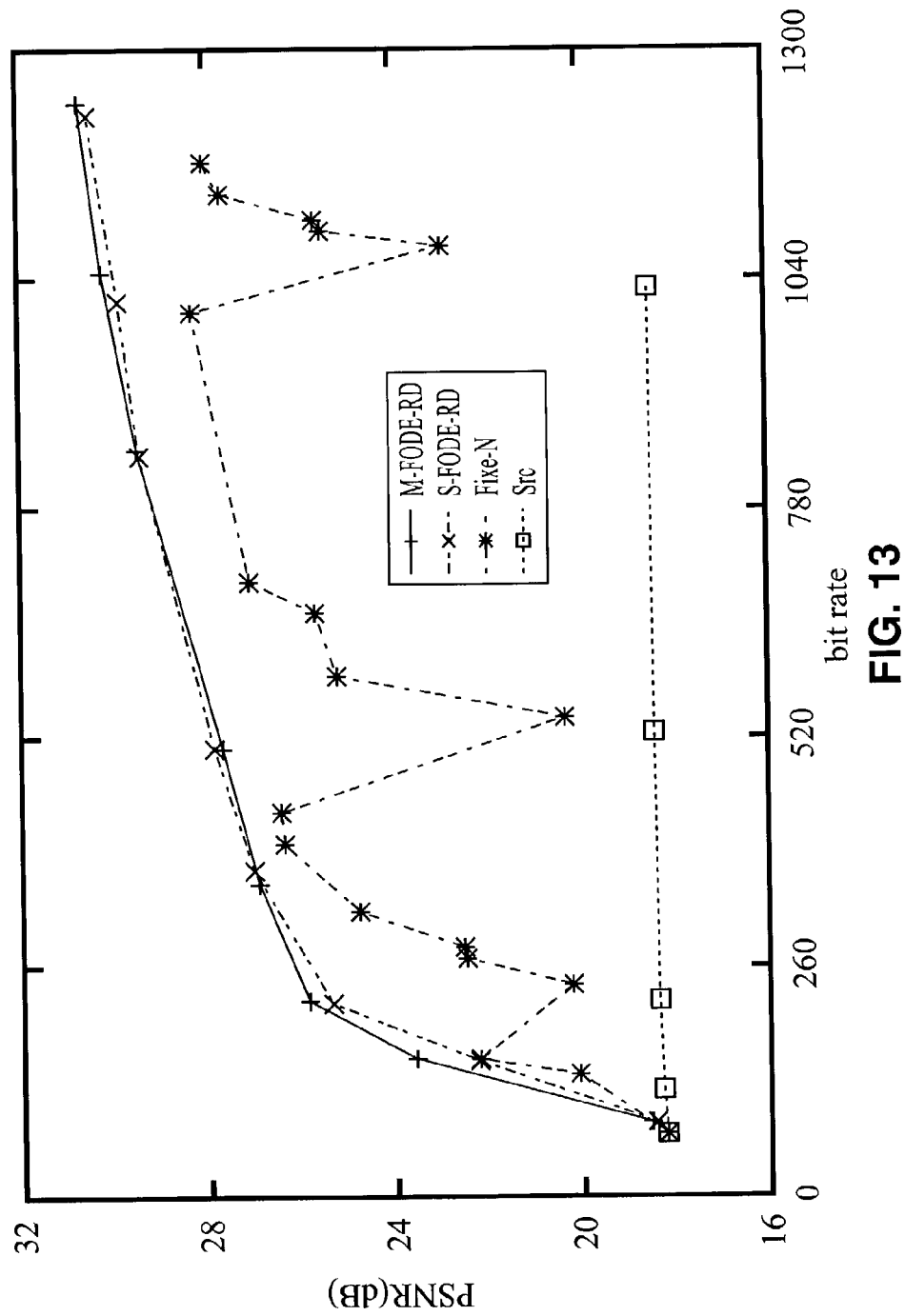
FIG. 13 is a plot of distortion (dB) for sending the CIF sequence "LTS" in packet erasure channel at 10 fps in a 5 layer bit-stream at 50/100/200/500/1000 kbps.
Figure 14:
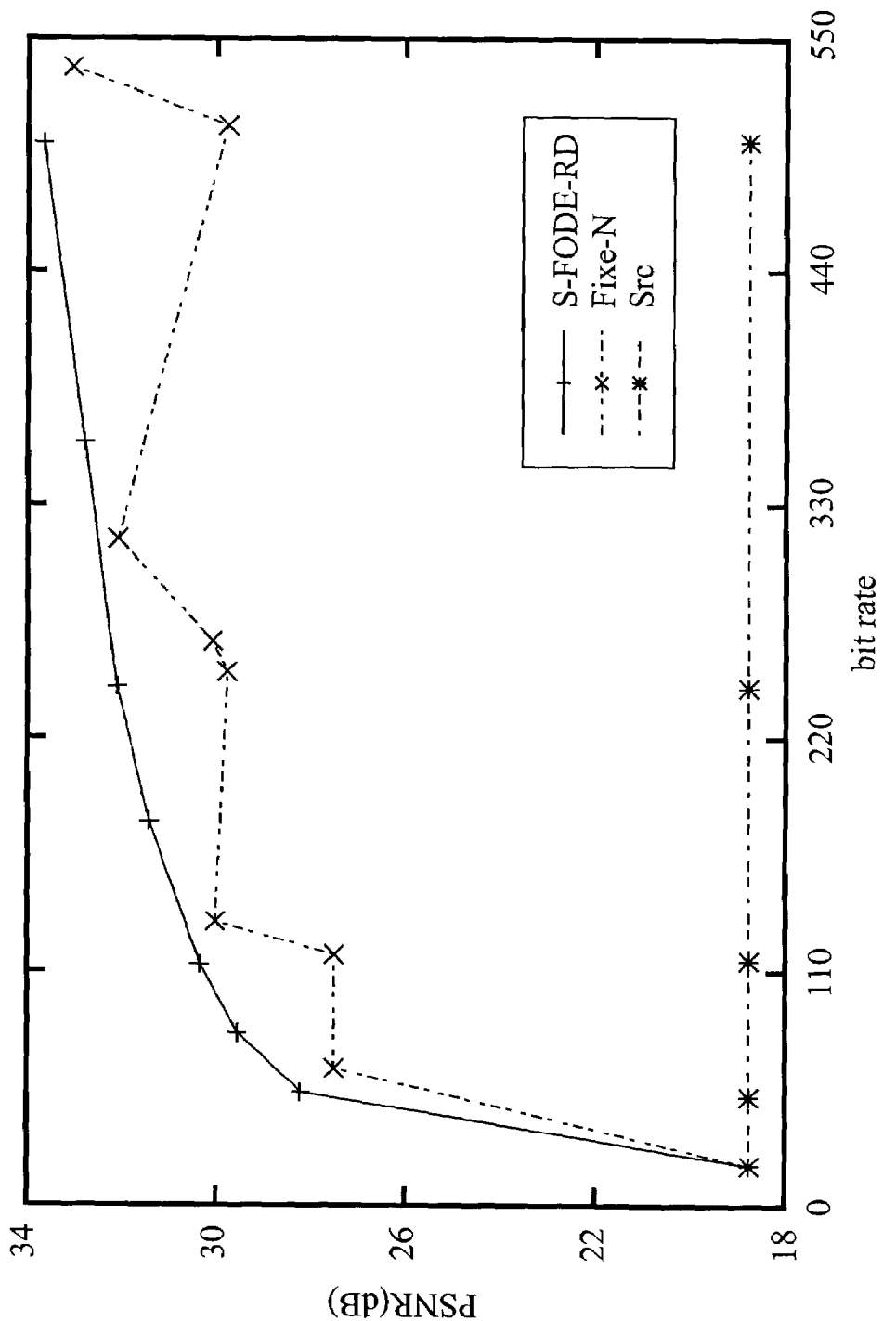
FIG. 14 is a plot of distortion (dB) for sending the QCIF sequence "carphone" in bit-error channel at 10 fps in a 5 layer bit-stream at 16/64/112/240/496 kbps.

FIG. 12 through FIG. 14 illustrate simulated decoder distortion for each of these schemes under different bit rates. FIG. 12 and FIG. 13 depict results for cross-packet protection in packet-erasure channel for QCIF sequence "carphone" and CIF sequence "LTS", respectively. FIG. 12 was performed at 10 fps in a 5 layer bit-stream at 16/64/112/240/496 kbps, while FIG. 13 was performed at 10 fps in a 5 layer bit-stream at 50/100/200/500/1000 kbps. FIG. 14 presents the result of within-packet protection in the bit-error channel for QCIF sequence "Carphone" at 10 fps in a 5 layer bit-stream at 16/64/112/240/496 kbps.

The results illustrate that FODE-RD schemes achieve substantial gains with enhanced flexibility in relation to fixed-N schemes, while providing smoother degradation as the network bandwidth decreases. The fluctuations of the fixed-N scheme can be seen in the figure, and these fluctuations arise because one fixed (n,k) FEC code results in one total bit rate which may provide inadequate bit allocation for the current channel status. It should also be noted that only a minor difference in performance can be seen when comparing the multi-FODE-RD scheme and single-FODE-RD scheme. Since both models appear to render high levels of performance, the similarity in response generally favors the use of the simple single-FODE model due to its reduced requirements for side-information.

4. Conclusion

End-to-end distortion estimation is a fundamental and crucial problem in RD-optimized adaptive delivery of pre-compressed video, or other streaming data, over lossy networks. The present invention includes computational methods of estimating overall end-to-end distortion with high levels of accuracy, low complexity, and low storage requirements. A preferred method utilizes a first-order Taylor expansion which provides a linear tool that can be executed readily with minimal side-information. The method takes into account all the effects associated with the compression algorithm of the encoder, the inter-packet dependencies, the varying network bandwidth and channel packet loss statistics, the delivery schemes, and the use of any decoder error concealment. The accuracy of the method was demonstrated by the results from simulations performed with the methods.

The distortion estimator, such as FODE, can be integrated within various delivery schemes being employed by diverse applications, and it provides robust transmission of pre-compressed data streams, such as video, or other media streams. The basic approach is independent of the specific strategies and is presented within a high-level rate-distortion optimized framework. The method involves only modest complexity due to the simplicity of the optimal linear estimation model when using FODE. A practical system with unequal error protection through FEC is constructed for the simulation to test and evaluate the superiority of the approach. It is important to recognize that the computation of a first-order estimation is general and not tailored to specific source or channel encoding schemes, the method can be employed with arbitrary encoding techniques and transport level delivery strategies, and the method may be applied to other forms of streaming media.

Accordingly, it will be seen that this invention provides methods for estimating end-to-end distortion within a network, as well as for providing an RD-based adaptive delivery method that preferably utilizes the end-to-end distortion estimation method of the invention. It should be appreciated that specific embodiments of the invention have been described to provide clarity, however, the methods described are generally applicable to estimating end-to-end distortion and providing adaptive transport tools for use with packetized digital data communication in general.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for packet based communication, comprising:
generating information from an uncompressed source data stream, said information determining distortion of the transmission of a compressed data stream as a function of network status values prior to transmission of the compressed data stream;
compressing the source data stream;
delivering packets of the compressed source data stream;
estimating total end-to-end distortion at the time of delivery for each packet based upon received network status values and the generated information;
wherein said estimating of said total end-to-end distortion is based on the selection of one or more reference distortion values from within said generated information that was generated under similar network status conditions to that of actual network status conditions; and
correcting selected reference distortion for an actual network status condition in response to additional elements of said generated information;
wherein said correcting of said selected reference distortion comprises:
computing a distortion offset that is determined in response to computing a distortion contribution over the range between an actual network status value and a reference network status value for which a selected reference distortion value was generated; and
adding said distortion offset to the reference distortion value;
wherein said distortion offset is computed from a partial derivative as retrieved from within said generated information.

2. A method as recited in claim 1, further comprising delivering said compressed data stream over said network according to an error correction mechanism selected in response to said estimated end-to-end distortion.

3. A method as recited in claim 2, further comprising determining transport cost factors which are evaluated in relation with the distortion estimations to arrive at said selection of an error correction mechanism.

4. A method as recited in claim 1, wherein said end-to-end distortion is determined at the time of delivery of said compressed data without making reference to said original uncompressed data stream.

5. A method as recited in claim 1, wherein said actual network status is determined at the time of delivery of said compressed data stream.

6. A method as recited in claim 5, wherein said network status comprises packet loss rate information.

7. A method as recited in claim 1, wherein said information is generated for each said packet within a group of packets and is separable from the compressed data stream.

8. A method as recited in claim 7, wherein said information is generated without knowledge of network status at the time of delivery of said compressed data stream.

9. A method as recited in claim 1, wherein said data stream comprises a video stream.

10. A method as recited in claim 9, wherein aspects of said method can be applied within video compression mechanisms for generating information and as a basis for making transport policy selections associated with error resilience mechanisms directed toward optimizing delivery decisions.

11. A method as recited in claim 1, wherein said partial derivative comprises a first or second-order partial derivative approximation.

12. A method as recited in claim 1, further comprising:
generating reference distortion values for reference values of network status for each packet within a group of packets; and
generating partial derivative information for each reference distortion value.

13. A method as recited in claim 1, further comprising reducing redundancy in the temporal, frequency, and/or spatial domains within said source data stream during compression.

14. A method as recited in claim 1, wherein said method is responsive to network factors affecting end-to-end distortion as selected from the group of distortion related factors consisting of quantization effects, compression, inter-dependencies among packets through prediction, error propagation, packet loss, and error concealment.

15. A method as recited in claim 1, wherein said method is generally applicable to existing wired and wireless data stream packet delivery mechanisms.

16. A method for estimating end-to-end distortion within a network subject to the transport of a compressed data stream, comprising:
generating information on selected characteristics of an uncompressed data stream in relation to the compressed data stream, said information determining distortion of the transmission of the compressed data stream as a function of network status values prior to transmission of the compressed data stream;
delivering packets of the com pressed source data stream;
determining end-to-end distortion from said generated information and information about actual network status at the time of delivery of said compressed data stream over said network;
generating reference distortion values for reference values of network status for each said packet; and
generating slope information for each reference distortion value.

17. A method as recited in claim 4, wherein said slope information comprises a partial derivative.

18. A method as recited in claim 5, wherein said partial derivative comprises a low-order partial derivative approximation.

19. A method as recited in claim 6, wherein said low-order partial derivative comprises a first or second-order partial derivative.

20. A method as recited in claim 4:
wherein network status information comprises packet loss information; and
wherein said reference distortion values comprise total end-to-end distortion values computed by raising packet loss and distortion by an event index within the packet and summing the product over the range of source packets within the group of packets.

21. A method as recited in claim 8, wherein the reference distortion $E_{\bar{p}}\{D\}$ is given by $$\sum_{k=0}^{2^N-1} \bar{p}^{(k)} D^{(k)},$$

wherein $\bar{p}$ is a predetermined packet loss rate, D is the overall end-to-end distortion, k is the index of the packet loss event, and N is the number of possible delivery events within a group of packets.

22. A method as recited in claim 8, wherein said generated information comprises distortion $E_{\bar{p}}\{D\}$ for reference packet loss rates for each packet within the group of packets and partial derivatives of the distortion for each packet.

23. A method as recited in claim 10, wherein said each said partial derivative of the distortion comprises a first-order partial derivative $\gamma_i$ for each packet according to $$\left(\frac{\partial E_P\{D\}}{\partial p_i}\bigg|\right)_{P=\bar{P}}.$$

24. A method as recited in claim 11, wherein said first-order partial derivative $\gamma_i$ may be determined according to $E_{\bar{p}}\{D|b_i=1\}-E_{\bar{p}}\{D|b_i=0\}$, wherein $b_i$ denotes the random outcome of delivery for packet i.

25. A method as recited in claim 10, wherein said partial derivatives of the distortion comprises a second-order partial derivative $\gamma_{i,j}$ for each packet according to $$\left(\frac{\partial^2 E_P\{D\}}{\partial p_i \partial p_j}\bigg|\right)_{P=\bar{P}}.$$

26. A method as recited in claim 13, wherein said second-order partial derivative $\gamma_{i,j}$ is determined according to $=E_{\bar{p}}\{D|b_i=1,b_j=1\}+E_{\bar{p}}\{D|b_i=0,b_j=0\}-E_{\bar{p}}\{D|b_i=1,b_j=0\}-E_{\bar{p}}\{D|b_i=0,b_j=1\}$ wherein $b_i$ and $b_j$ denote the random outcome of delivery for packet i and packet j, while $p_i$ and $p_j$ represent the effective packet loss rates for packet i and packet j.

27. A method as recited in claim 16, wherein said data stream comprises a scalable data stream.

28. A method as recited in claim 27, wherein said scalable data stream comprises inter-dependent packet layers.

29. A method as recited in claim 27, wherein said scalable data stream comprises a video stream.

30. A method as recited in claim 29, wherein said video stream is stored in a compressed format and transmitted in response to a video-on-demand request.

31. A method as recited in claim 29, wherein said video stream is stored in a compressed format and transmitted through heterogeneous networks to provide for media distribution.

32. A method as recited in claim 29, wherein said video stream is stored in a compressed format and transmitted as part of a multicast transmission.

33. A method as recited in claim 16, wherein said actual network status is only known at the time of delivery of said pre-compressed data stream.

34. A method as recited in claim 16, wherein said side-information for each group of packets is stored for access at or before the time that the group of packets is to be transported over said network as part of said compressed data stream.

35. A method as recited in claim 16, wherein said determination of end-to-end distortion relies on selecting reference distortion values within the generated information which were generated according to reference network status values similar to actual network status values received at the time of transport.

36. A method for estimating end-to-end distortion within a network subject to the transport of a compressed data stream, comprising:
generating information on selected characteristics of an uncompressed data stream in relation to the compressed data stream, said information determining distortion of the transmission of the compressed data stream as a function of network status values prior to transmission of the compressed data stream;
delivering packets of the compressed source data stream;
determining end-to-end distortion from said generated information and information about actual network status at the time of delivery of said compressed data stream over said network;
wherein said determination of end-to-end distortion relies on selecting reference distortion values within the generated information which were generated according to reference network status values similar to actual network status values received at the time of transport; and
adding an offset distortion value computed by applying slope information contained in the generated information over the difference between said actual network status value and the reference network status value at which the selected reference distortion value was derived.

37. A method as recited in claim 36, wherein overall end-to-end distortion $E_p\{D\}$ may be exactly computed as $$\sum_{k=0}^{2^N-1} \left( \prod_{i=0}^{N-1} (1-p_i)^{(1-b_i^{(k)})} p_i^{b_i^{(k)}} \right) D^{(k)}$$

wherein p is the effective packet loss rate for packet i, $b_i$ is the random outcome of delivery for packet i, D is the overall channel distortion, k is the index of the packet loss event, and N is the number of possible delivery events within a group of packets.

38. A method as recited in claim 37, wherein said computation of overall end-to-end distortion may be approximated to reduce computational overhead and/or the required amount of side-information.

39. A method as recited in claim 38, wherein said approximation of said computations comprises a Taylor series expansion to any desired order.

40. A method as recited in claim 39, wherein a first-order Taylor expansion results in the estimated total end-to-end distortion as given by $$E_{\bar{p}}\{D\} + \sum_{i=0}^{N-1} \gamma_i \Delta p_i,$$

wherein $\Delta p_i = p_i - \bar{p}_i$.

41. A method as recited in claim 39, wherein a second-order Taylor expansion results in the estimated total end-to-end distortion as given by $$E_P\{D\} + \sum_{i=0}^{N-1} \gamma_i \Delta p_i + \frac{1}{2!} \sum_{i=0}^{N-1} \sum_{j=0}^{N-1} \gamma_{i,j} \Delta p_i \Delta p_j,$$

wherein $\Delta p_i = p_i - \bar{p}_i$ and $\Delta p_j = p_j - \bar{p}_j$.

42. A method as recited in claim 36, wherein said method takes into account the effects of quantization, compression, inter-dependencies among packets through prediction along with error propagation, packet loss, and error concealment when estimating total end-to-end distortion.

43. A method as recited in claim 36, wherein said method is generally applicable to all existing media stream packet delivery mechanisms.

44. A method as recited in claim 36:
wherein said media stream comprises a video stream; and
wherein said method can be applied within video compression mechanisms for generating information and for making transport policy selections associated with error resilience mechanisms toward optimizing delivery decisions.

45. An apparatus for estimating overall end-to-end distortion for a pre-compressed data stream for which appropriate information is available. comprising:
means for accessing information for an associated compressed data stream; and
means for selecting from the information a distortion value from within a plurality of distortion values for the given packet based on the amount of similarity between actual network status information as received from the network and the reference network status values used for generating said reference distortion values;
wherein said means for selecting an estimated distortion value comprises a processor configured for executing programmed instructions stored on a computer-readable medium for,
determining which predetermined value for reference network status value sufficiently approximates the actual network status value as received during transport, and
mapping said predetermined reference value of network status into an index within the plurality of distortion values for accessing and selecting the associated reference distortion for output.

46. An apparatus as recited in claim 45, wherein said means for accessing information comprises a processing element configured for executing programmed instructions stored on a computer-readable medium for retrieving information from within files associated with a pre-compressed data stream being transmitted.

47. An apparatus for estimating overall end-to-end distortion for a pre-compressed data stream for which appropriate information is available, comprising:
means for accessing information for an associated compressed data stream;
means for selecting from the information a distortion value from within a plurality of distortion values for the given packet based on the amount of similarity between actual network status information as received from the network and the reference network status values used for generating said reference distortion values; and
means for selecting a partial derivative associated with said selected distortion value and utilizing the partial derivative to correct the selected reference distortion value in view of the difference between the reference value of network status and the actual network status received at the time of transmission.

48. An apparatus as recited in claim 47:
wherein said means for selecting the partial derivative and correcting the selected reference value of distortion comprises a processor configured for executing programmed instructions for,
accessing the partial derivative associated with a selected distortion value from within said information,
determining a distortion offset based on the partial derivative applied over the range between said actual network status and said reference network status utilized to generate the associated distortion reference value, and
adding said distortion offset to said selected distortion value to arrive at a corrected estimated for the end-to-end distortion value.

* * * * *

UNITED STATES PATENT AND TRADEMARK OFFICE
CERTIFICATE OF CORRECTION

PATENT NO. : 7,639,739 B2
APPLICATION NO. : 10/286364
DATED : December 29, 2009
INVENTOR(S) : Rose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2024 days.

Signed and Sealed this

Twenty-first Day of December, 2010

David J. Kappos
*Director of the United States Patent and Trademark Office*